United States Patent
Raissinia et al.

(10) Patent No.: US 11,431,539 B2
(45) Date of Patent: Aug. 30, 2022

(54) SECURE LONG TRAINING FIELD (LTF) TRANSMIT WINDOW SIGNALING

(71) Applicant: QUALCOMM Incorporated, San Diego, CA (US)

(72) Inventors: Alireza Raissinia, Monte Sereno, CA (US); Bin Tian, San Diego, CA (US); Stephen Jay Shellhammer, Ramona, CA (US); Youhan Kim, Saratoga, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/145,641

(22) Filed: Jan. 11, 2021

(65) Prior Publication Data
US 2022/0224579 A1    Jul. 14, 2022

(51) Int. Cl.
*H04L 27/26* (2006.01)
*H04W 84/12* (2009.01)
*H04L 69/323* (2022.01)

(52) U.S. Cl.
CPC ...... *H04L 27/2613* (2013.01); *H04L 27/2628* (2013.01); *H04L 69/323* (2013.01); *H04W 84/12* (2013.01)

(58) Field of Classification Search
CPC ............. H04L 27/2613; H04L 27/2605; H04L 27/2627; H04L 27/2628
(Continued)

(56) References Cited

U.S. PATENT DOCUMENTS

2005/0180386 A1* 8/2005 Hansen ............... H04L 27/2603
                                                            370/350
2012/0163497 A1   6/2012 Kim et al.
(Continued)

OTHER PUBLICATIONS 802 11 Working Group Of LAN/WAN Standard Committee of the IEEE: IEEE Draft, Draft P802.11AZ_D2.2, IEEE-SA, Piscataway, NJ USA vol. 802.11az drafts, No. D2.2, May 11, 2020 (May 11, 2020), pp. 1-242, XP068171842, Retrieved from the Internet: URL: https://www.ieee802.org/11/private/Draft_Standards/11az/Draft%20P802.11az_D2.2.pdf [Retrieved on May 11, 2020] figures 9-1006,9-881 p. 73, lines 15-20 p. 78, paragraph 1. p. 79, lines 9-23 p. 93, lines 14-21 sections 11 . . . 22. 6. 4. 6. 2 and 11 . . . 22.6.4.6.3 and 27.3.18d.
(Continued)

*Primary Examiner* — Emmanuel Bayard
(74) *Attorney, Agent, or Firm* — Paradice and Li LLP; Kevin M. Donnelly

(57) ABSTRACT

This disclosure provides methods, devices and systems for improving the security of secure long training field (LTF) transmissions. In some implementations, a transmitting device may perform windowing on a secure LTF, in the frequency domain, so that the resulting time-domain LTF signal is difficult, if not impossible, to predict by any device that observes a portion of the LTF signal. In some aspects, the transmitting device may negotiate the windowing of secure LTFs with a receiving device based on fine timing measurement (FTM) negotiation frames exchanged at the start of an FTM procedure. In some other aspects, the transmitting device may dynamically or adaptively perform windowing on secure LTFs. In such aspects, the transmitting device may indicate whether windowing is performed on a secure LTF based on information carried in a signal field of a physical layer convergence protocol (PLCP) protocol data unit (PPDU) that includes the secure LTF.

37 Claims, 19 Drawing Sheets

(58) Field of Classification Search
USPC .......................................... 375/260, 295, 340
See application file for complete search history.

(56) References Cited

U.S. PATENT DOCUMENTS

| | | | |
|---|---|---|---|
| 2018/0027485 A1* | 1/2018 | Kneckt | H04W 8/005 |
| | | | 370/338 |
| 2019/0014466 A1* | 1/2019 | Seok | H04W 12/04 |
| 2019/0182674 A1* | 6/2019 | Li | H04W 12/122 |
| 2020/0145160 A1* | 5/2020 | Jiang | H04L 5/0091 |
| 2021/0014018 A1* | 1/2021 | Noh | H04L 1/0023 |

OTHER PUBLICATIONS

Berger C., (NXP): "Analysis of Secure LTF Frequency Windows", IEEE Draft, 11-21-0039-00-00AZ-Analysis-of-Secure-LTF-Frequency-Windows, IEEE-SA Mentor, Piscataway, NJ USA, vol. 802.11az, Jan. 6, 2021 (Jan. 6, 2021), pp. 1-25, XP068175687, Retrieved from the Internet: URL: https://mentor.ieee.org/802.11/dcn/21/11-21-0039-00-00az-analysis-of-secure-ltf-frequency-windows.pptx [Retrieved on Jan. 10, 2021] The Whole Document.
International Search Report and Written Opinion—PCT/US2021/062563—ISA/EPO—dated Mar. 30, 2022.
Liu J., (Mediatek Inc): "On Capability of Supporting Windowing for Secure Ltf", IEEE Draft, 11-21-0071-00-00AZ-On-Capability-of-Supporting-Windowing-for-Secure-LTF, IEEE-SA Mentor, Piscataway, NJ USA, vol. 802.11az, Jan. 8, 2021 (Jan. 8, 2021), pp. 1-5, XP068175735, Retrieved from the Internet: URL: https://mentor.ieee.org/802.11/dcn/21/11-21-0071-00-00az-on-capability-of-supporting-windowing-for-secure-ltf.pptx [retrieved on Jan. 11, 2021] The Whole Document.

* cited by examiner

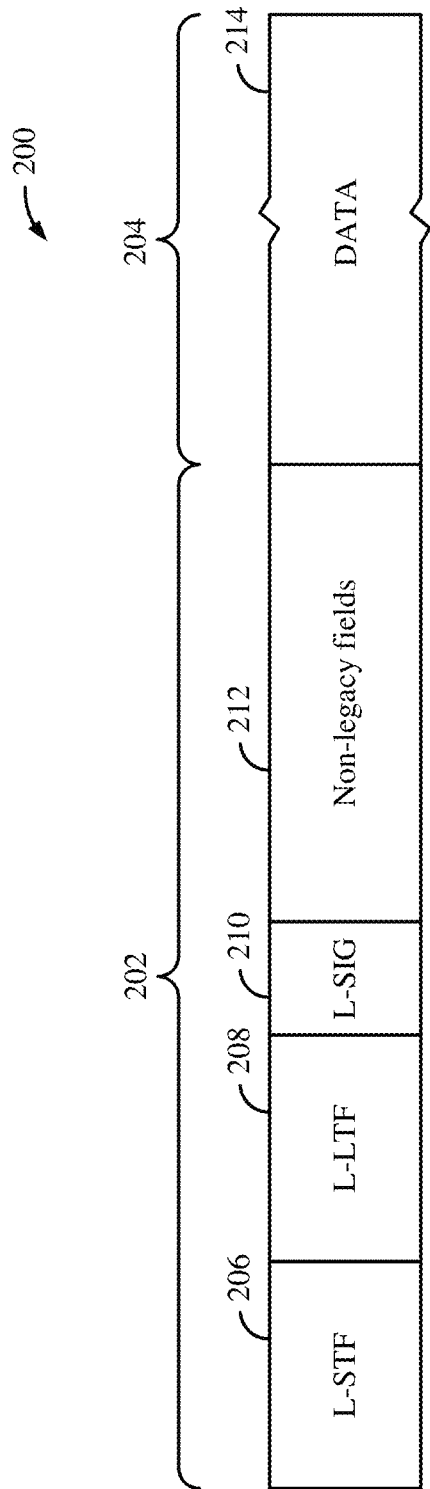
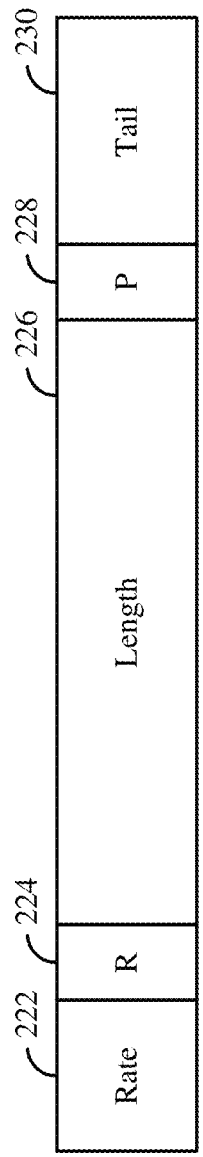
*Figure 2A*
*Figure 2B*

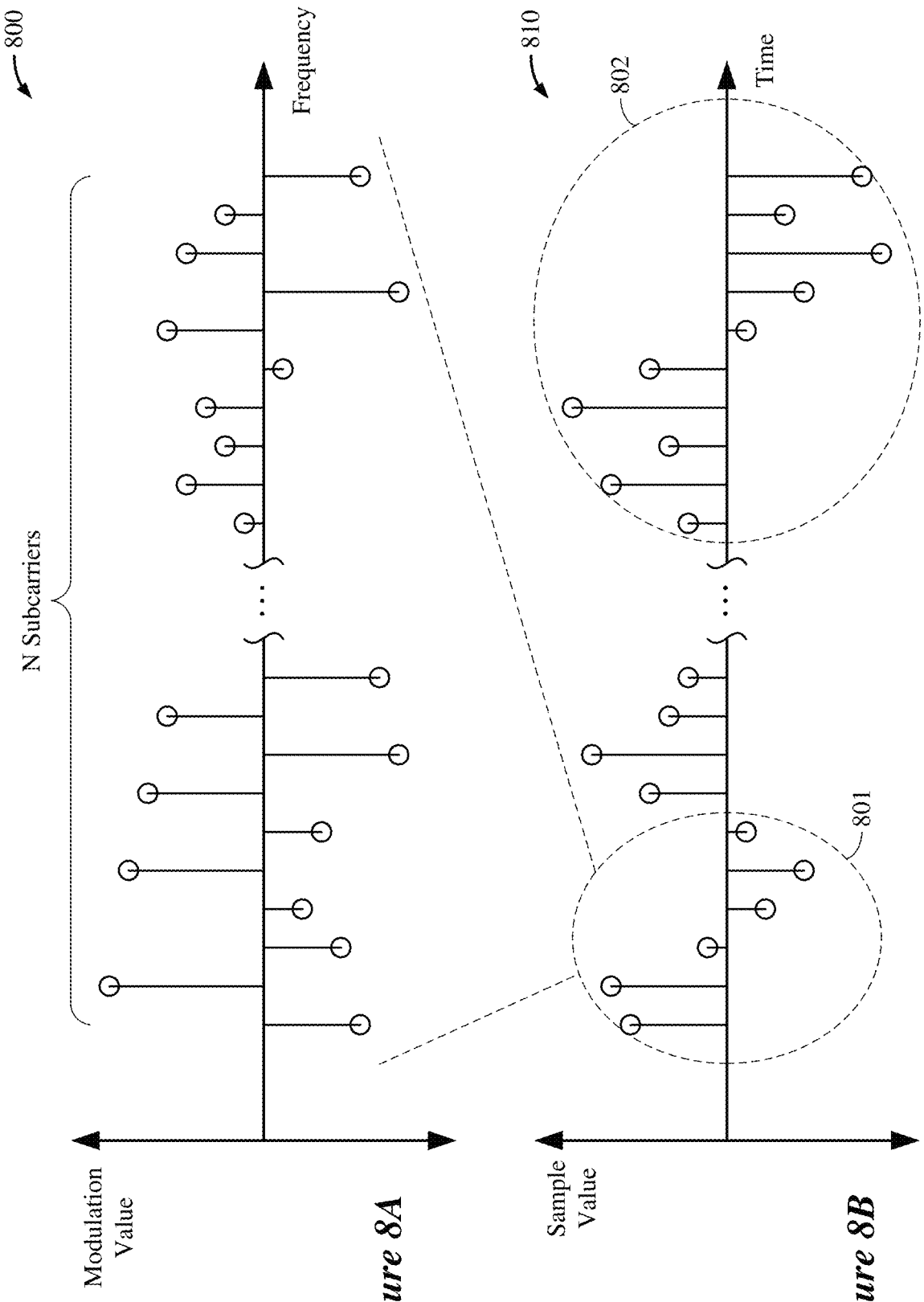

| Bit Position: | B0 B1 | B2 B6 | B7 | B8 | B9 | B10 B11 | B12 | B13 | B14 | B15 |
|---|---|---|---|---|---|---|---|---|---|---|
| | Status Indication | Value | I2R LMR Feedback | Secure LTF Req. | Secure LTF Support | Ranging Priority | R2I TOA Type | I2R TOA Type | R2I AOA Request | I2R AOA Request |
| # Bits: | 2 | 5 | 1 | 1 | 1 | 2 | 1 | 1 | 1 | 1 |

| Bit Position: | B16 B21 | B22 | B23 | B24 B26 | B27 B29 | B30 | B31 | B32 B34 | B35 B37 |
|---|---|---|---|---|---|---|---|---|---|
| | Format and Bandwidth | Immediate R2I Feedback | Immediate I2R Feedback | Max I2R Repetition | Max R2I Repetition | Device Class | Full Bandwidth UL MU-MIMO | Max R2I STS ≤ 80 MHz | Max R2I STS > 80 MHz |
| # Bits: | 6 | 1 | 1 | 3 | 3 | 1 | 1 | 3 | 3 |

| Bit Position: | B38 B39 | B40 B41 | B42 B44 | B45 B47 | B48 | B49 | B50 | B55 |
|---|---|---|---|---|---|---|---|---|
| | Max R2I LTF Total | Max I2R LTF Total | Max I2R STS ≤ 80 MHz | Max I2R STS > 80 MHz | I2R TX Window | R2I TX Window | Reserved | |
| # Bits: | 2 | 2 | 3 | 3 | 1 | 1 | 6 | |

*Figure 13*

SECURE LONG TRAINING FIELD (LTF) TRANSMIT WINDOW SIGNALING

TECHNICAL FIELD

This disclosure relates generally to wireless communication, and more specifically, to windowing of secure long training field (LTF) transmissions.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

The IEEE 802.11 standard defines a packet format, to be used for wireless communication, which includes one or more long training fields (LTFs). LTFs are generally used for channel estimation purposes. For example, a transmitting device may transmit a known pattern of symbols, in an LTF, to a receiving device. The receiving device may use its knowledge of the symbol pattern in the received LTF to estimate how wireless communications propagate through a wireless channel between the transmitting device and the receiving device. Unlike data fields, LTFs do not carry any useful information or user-specific data. Thus, in accordance with existing versions of the IEEE 802.11 standard, LTF symbols are transmitted with very little or no security. However, recent amendments to the IEEE 802.11 standard (such as 802.11az) have expanded the uses for LTFs in ways which may be subject to attack. It is therefore desirable to provide greater security for LTFs used in some wireless communications.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include receiving, from a receiving device, a first frame carrying first windowing information indicating whether the receiving device supports windowing of a long training field (LTF) of a physical layer convergence protocol (PLCP) protocol data unit (PPDU); obtaining a sequence of modulation symbols to be included in the LTF of the PPDU, where each of the modulation symbols is modulated on a respective subcarrier associated with the LTF; selectively applying a window function to the sequence of modulation symbols based on the first windowing information in the first frame; converting the sequence of modulation symbols to a time-domain LTF signal based on an inverse Fourier transform; and transmitting the LTF signal to the receiving device. In some implementations, the transmitted LTF signal does not include a cyclic prefix.

In some implementations, the first frame may be an initial fine timing measurement request (IFTMR) frame that initiates a fine timing measurement (FTM) procedure. In some aspects, the method may further include transmitting an initial fine timing measurement (IFTM) frame to the receiving device responsive to receiving the IFTMR frame, where the IFTM frame carries second windowing information indicating whether the wireless communication device supports the windowing of the LTF. In some aspects, the first windowing information may be carried in a ranging parameters field of the IFTMR frame and the second windowing information may be carried in a ranging parameters field of the IFTM frame.

In some other implementations, the method may further include transmitting, to the receiving device, an IFTMR frame that initiates an FTM procedure, where the first frame is an IFTM frame that responds to the IFTMR frame. In some aspects, the IFTMR frame may carry second windowing information indicating whether the wireless communication device supports the windowing of the LTF. In some aspects, the first windowing information may be carried in a ranging parameters field of the IFTM frame and the second windowing information may be carried in a ranging parameters field of the IFTMR frame.

In some implementations, the selective applying of the window function may include determining a range of the receiving device to the wireless communication device and determining whether to apply the window function to the sequence of modulation symbols based on the determined range. In some aspects, the determining of the range of the receiving device may include receiving, from the receiving device, ranging information indicating an estimate of the range.

In some other implementations, the selective applying of the window function may include estimating a wireless channel over which the LTF signal is transmitted and determining whether to apply the window function to the sequence of modulation symbols based on the channel estimate. Still further, in some implementations, the selective applying of the window function may include determining a security requirement for the LTF signal and determining whether to apply the window function to the sequence of modulation symbols based on the security requirement.

In some implementations, the window function may be applied to the sequence of modulation symbols based on the first windowing information indicating that the receiving device supports windowing of the LTF. In some aspects, the method may further include transmitting, to the receiving device, second windowing information indicating that the window function is applied to the sequence of modulation symbols. In some aspects, the second windowing information may be transmitted via a signal field of the PPDU that includes the LTF signal.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving, from a receiving device, a first frame carrying first windowing information indicating whether the receiving device supports windowing of an LTF of a PPDU; obtaining a sequence of modulation symbols to be included in the LTF of the PPDU, where each of the modulation symbols is modulated on a respective subcarrier associated with the LTF; selectively applying a window function to the sequence of modulation symbols based on the first windowing information in the first frame; converting the sequence of modulation symbols to a time-domain LTF signal based on an inverse Fourier transform; and transmitting the LTF signal to the receiving device.

Another innovative aspect of the subject matter described in this disclosure can be implemented as a method of wireless communication. The method may be performed by a wireless communication device, and may include receiving, from a transmitting device, a wireless signal representing an LTF of a PPDU; converting the wireless signal to a sequence of modulation symbols based on a Fourier transform, where each of the modulation symbols is modulated on a respective subcarrier associated with the LTF; receiving, from the transmitting device, first windowing information indicating whether a window function is applied to the sequence of modulation symbols; and estimating a range of the transmitting device to the wireless communication device based on the received LTF signal and the first windowing information. In some implementations, the received wireless signal does not include a cyclic prefix.

In some implementations, the first windowing information may be received via a signal field of the PPDU that includes the LTF signal. In some aspects, the method may further include determining the first windowing information based on a value of a modulation and coding scheme (MCS) field of the signal field. In some other aspects, the method may further include determining the first windowing information based on values of a coding field and a low-density parity-check (LDPC) extra symbol segment field of the signal field. In some aspects, the method may further include determining the first windowing information based on a value of a beamformed field of the signal field. Still further, in some aspects, the method may further include determining the first windowing information based on a value of a cyclic redundancy check (CRC) field of the signal field.

In some implementations, the first windowing information may be received via an IFTMR frame that initiates an FTM procedure. In some aspects, the method may further include transmitting an IFTM frame to the transmitting device responsive to receiving the IFTMR frame, where the IFTM frame carries second windowing information indicating whether the wireless communication device supports the application of the window function by the transmitting device. In some aspects, the first windowing information may be carried in a ranging parameters field of the IFTMR frame and the second windowing information may be carried in a ranging parameters field of the IFTM frame.

In some other implementations, the method may further include transmitting, to the transmitting device, an IFTMR frame that initiates an FTM procedure, where the first windowing information is received via an IFTM frame that responds to the IFTMR frame. In some aspects, the IFTMR frame may carry second windowing information indicating whether the wireless communication device supports the application of the window function by the transmitting device. In some aspects, the first windowing information may be carried in a ranging parameters field of the IFTM frame and the second windowing information may be carried in a ranging parameters field of the IFTMR frame.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving, from a transmitting device, a wireless signal representing an LTF of a PPDU; converting the wireless signal to a sequence of modulation symbols based on a Fourier transform, where each of the modulation symbols is modulated on a respective subcarrier associated with the LTF; receiving, from the transmitting device, first windowing information indicating whether a window function is applied to the sequence of modulation symbols; and estimating a range of the transmitting device to the wireless communication device based on the received LTF signal and the first windowing information.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 2A shows an example protocol data unit (PDU) usable for communications between an access point (AP) and one or more stations (STAs).

FIG. 2B shows an example field in the PDU of FIG. 2A.

FIG. 8A shows a frequency diagram of an example long training field (LTF) sequence usable for communications between wireless communication devices.

FIG. 8B shows a timing diagram depicting an example LTF signal usable for communications between wireless communication devices.

FIG. 13 shows an example ranging parameters field for an FTM negotiation frame according to some implementations.

Like reference numbers and designations in the various drawings indicate like elements.

DETAILED DESCRIPTION

Figure 1:
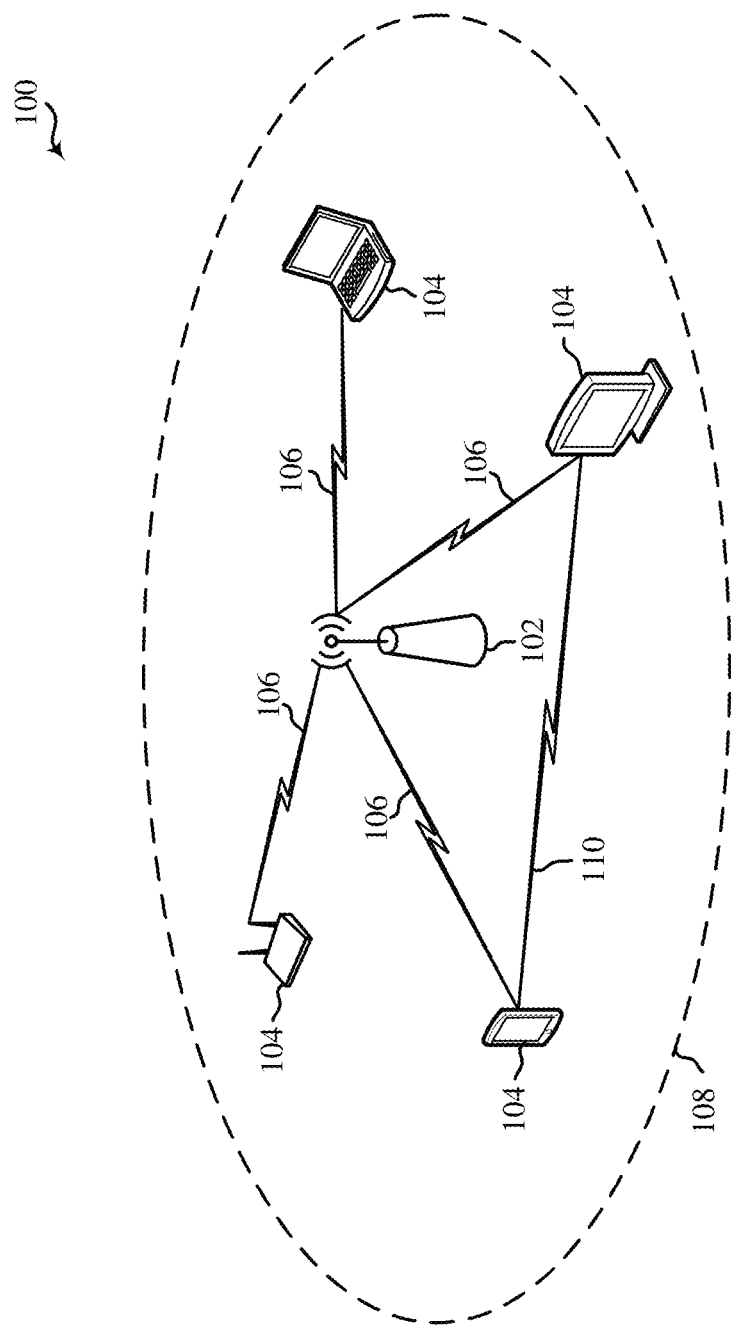
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to long training fields (LTFs) used in wireless communications, and more particularly, to generating secure LTFs that are resilient to attack. In some aspects, a transmitting device may perform windowing on a secure LTF, in the frequency domain, so that the resulting time-domain LTF signal is difficult, if not impossible, to predict by any device that observes a portion of the LTF signal. For example, the transmitting device may apply a window function to a sequence of frequency-domain modulation symbols associated with the secure LTF. The window function reduces the magnitude of the corresponding waveform in the time domain before and after a given window of time (coinciding with a pulse width of the LTF signal). In some aspects, the transmitting device may negotiate the windowing of secure LTFs with a receiving device based on initial fine timing measurement (IFTM) frames and initial fine timing measurement request (IFMTR) frames exchanged at the start of a fine timing measurement (FTM) procedure. In some other aspects, the transmitting device may dynamically or adaptively perform windowing on secure LTFs. In such aspects, the transmitting device may indicate whether windowing is performed on a secure LTF based on information carried in a signal field of a physical layer convergence protocol (PLCP) protocol data unit (PPDU) that includes the secure LTF.

Particular implementations of the subject matter described in this disclosure can be implemented to realize one or more of the following potential advantages. In some implementations, the described techniques can be used to improve the security of LTFs used in wireless communications. Aspects of the present disclosure recognize that, because an LTF signal is bandlimited, there may be some degree of correlation among samples of the LTF signal occurring consecutively in time. As a result, an attacker (or unintended receiving device) may receive a portion of an LTF signal and determine or predict a subsequent portion of the LTF signal, for example, based on a linear minimum mean square error (MMSE) estimate. A sophisticated attacker may even copy or spoof the LTF signal before the transmitting device has finished transmitting the original LTF signal to the receiving device. For example, the attacker may transmit the spoofed LTF signal to the receiving device to cause errors in channel or ranging measurements by the receiving device. By windowing the transmitted LTF signal, aspects of the present disclosure may reduce the degree of correlation between successive samples of the LTF signal and thus prevent an attacker from predicting the remainder of the LTF signal from a received portion. Although a windowed LTF signal may perform poorly for certain applications (such as ranging), by performing the windowing dynamically, aspects of the present disclosure may balance the security of the LTF signal with various other considerations (such as ranging performance).

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
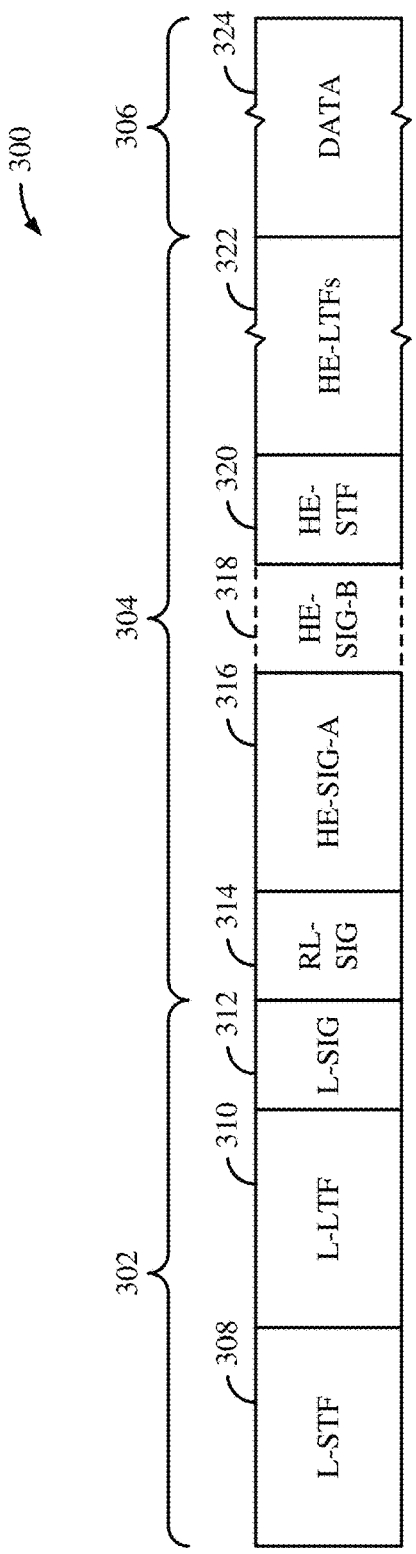
FIG. 3A shows an example PHY layer convergence protocol (PLCP) protocol data unit (PPDU) usable for communications between an AP and one or more STAs.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
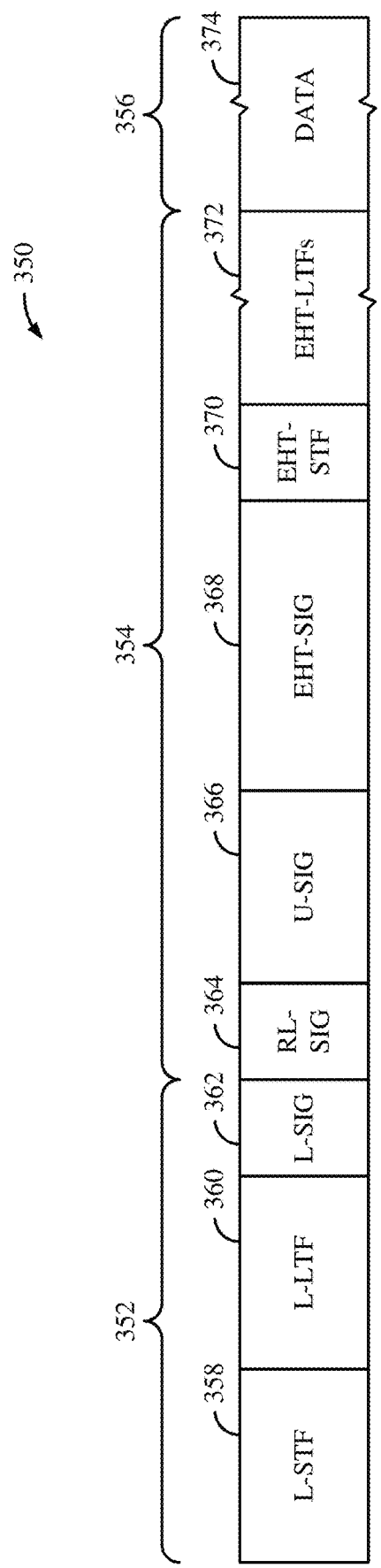
FIG. 3B shows another example PPDU usable for communications between an AP and one or more STAs.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

Figure 4:
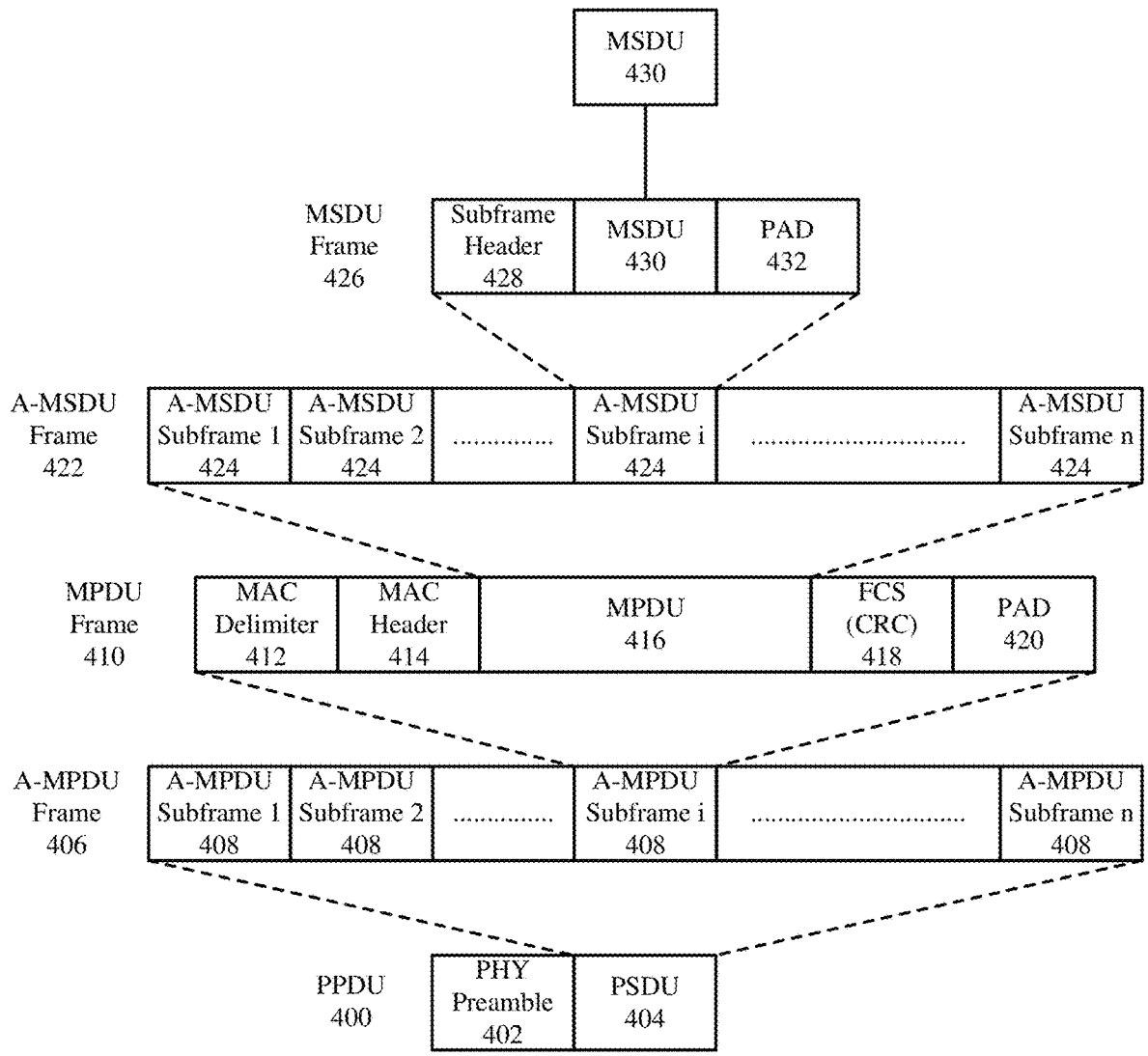
FIG. 4 shows an example PHY protocol data unit (PPDU) usable for communications between an AP and one or more STAs.

FIG. 4 shows an example PPDU 400 usable for communications between an AP 102 and one or more STAs 104. As described above, each PPDU 400 includes a PHY preamble 402 and a PSDU 404. Each PSDU 404 may represent (or "carry") one or more MAC protocol data units (MPDUs)

416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which comprises the data portion ("payload" or "frame body") of the MPDU frame 410. Each MPDU frame 410 may also include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

Figure 5:
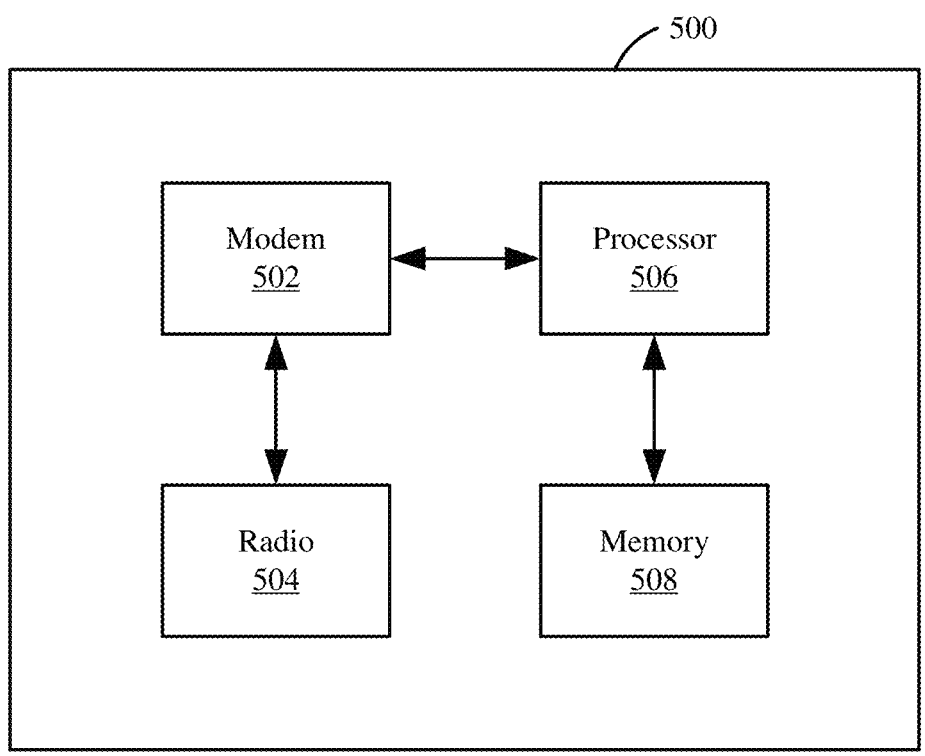
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described with reference to FIG. 1. In some implementations, the wireless communication device 500 can be an example of a device for use in an AP such as the AP 102 described with reference to FIG. 1. The wireless communication device 500 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506") and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
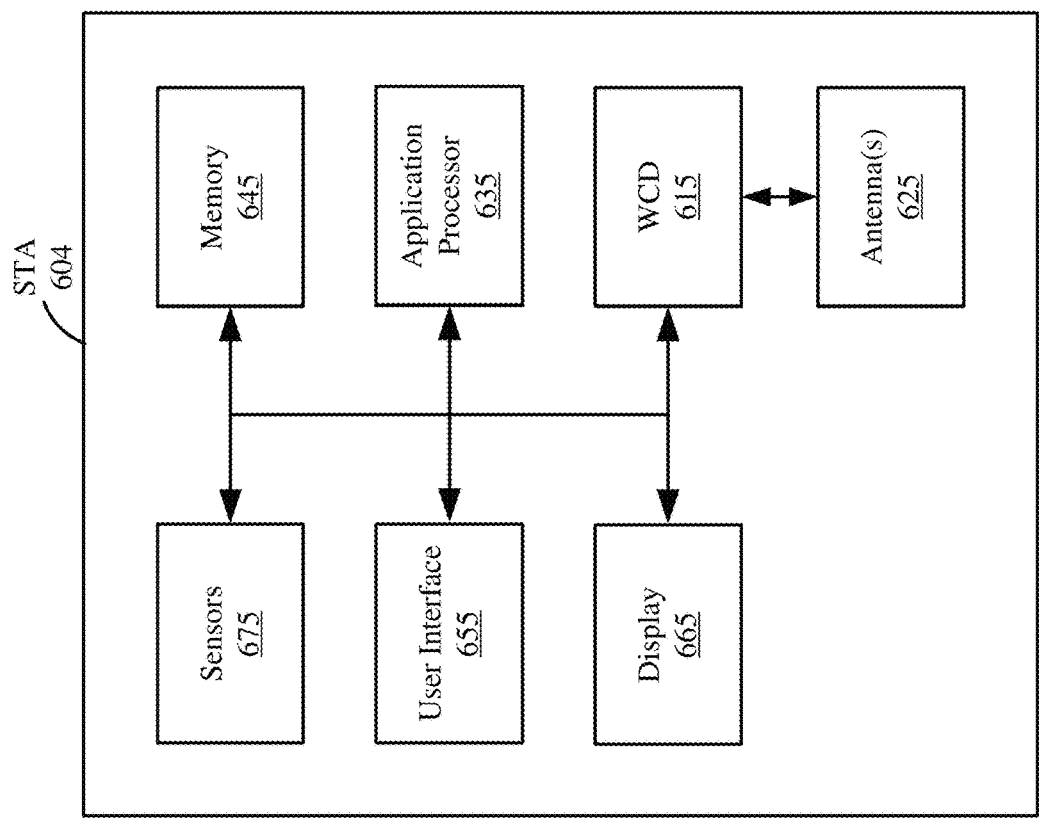
FIG. 6B shows a block diagram of an example station (STA).
Figure 6A:
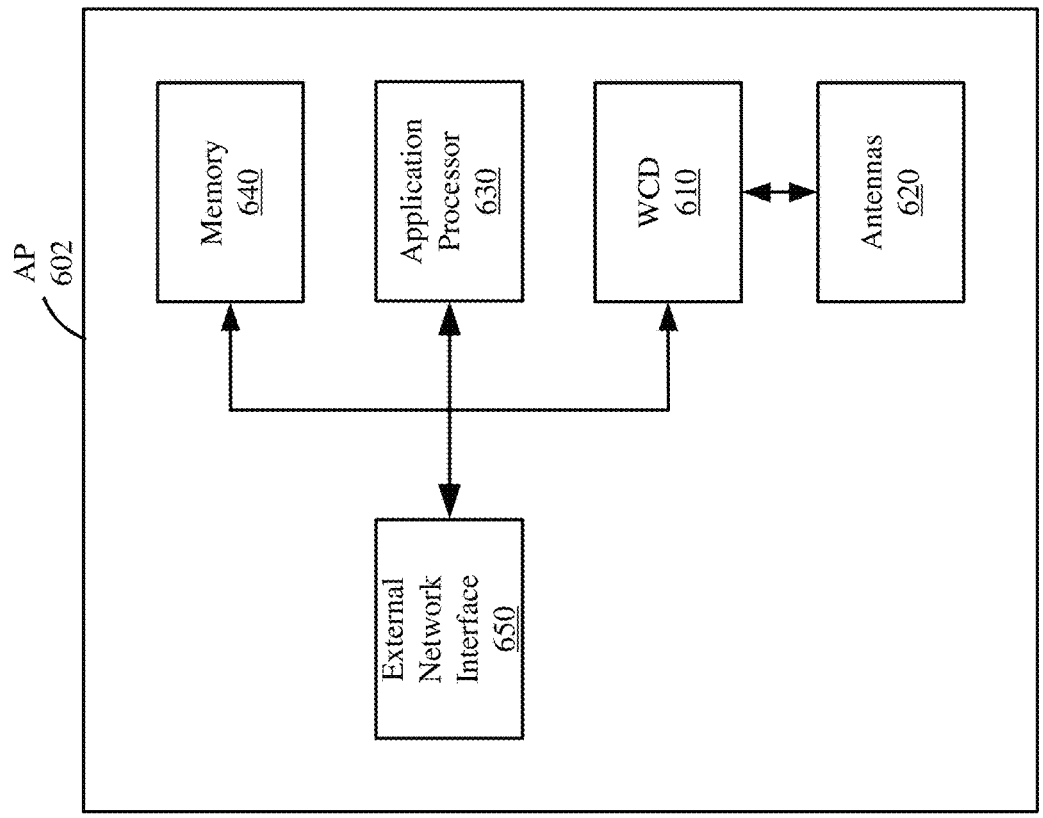
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610 (although the AP 602 may itself also be referred to generally as a wireless communication device as used herein). For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615 (although the STA 604 may itself also be referred to generally as a wireless communication device as used herein). For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

Figure 7:
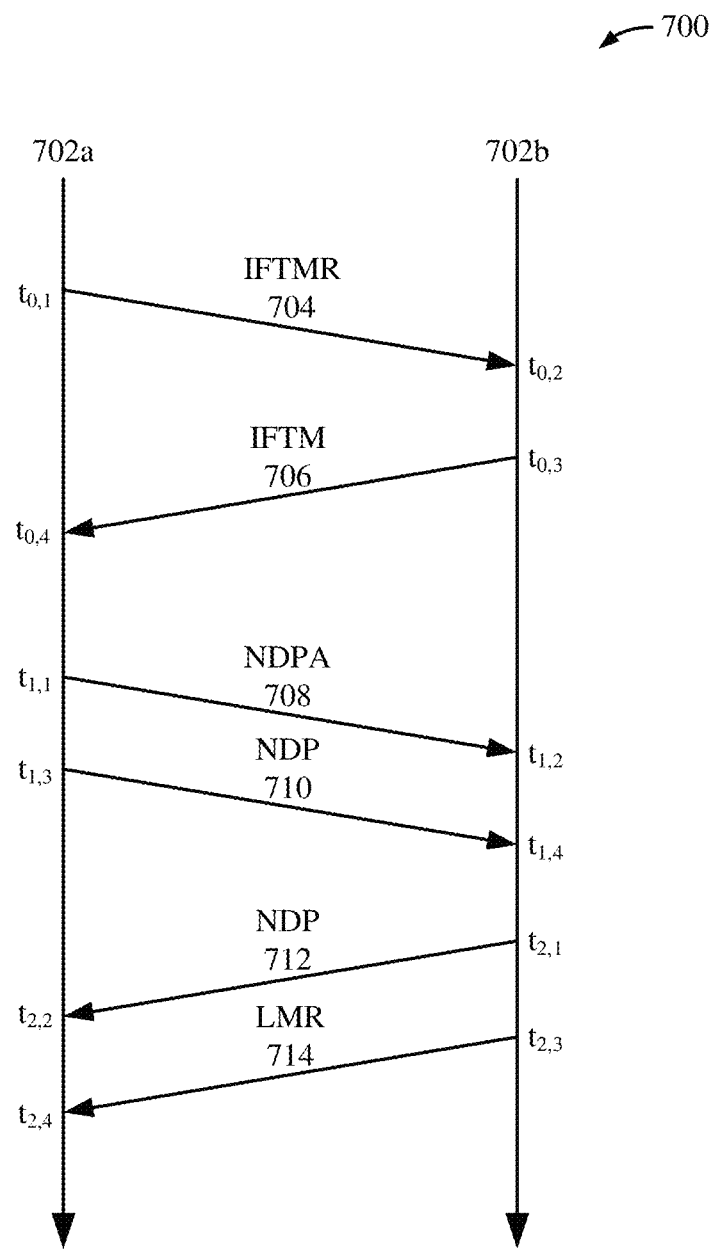
FIG. 7 shows a timing diagram illustrating an example process for performing a ranging operation.

Aspects of transmissions may vary based on a distance between a transmitter (for example, an AP 102 or a STA 104) and a receiver (for example, another AP 102 or STA 104). Wireless communication devices may generally benefit from having information regarding the location or proximities of the various STAs 104 within the coverage area. In some examples, relevant distances may be computed using RTT-based ranging procedures. Additionally, in some implementations, APs 102 and STAs 104 may be configured to perform ranging operations. Each ranging operation may involve an exchange of ranging null data packets (NDPs) (such as those defined in the IEEE 802.11az specification or revisions or updates thereof). FIG. 7 shows a timing diagram illustrating an example process for performing a ranging operation 700. The process for the ranging operation 700 may be conjunctively performed by two wireless devices 702a and 702b, which may each be an example of an AP 102 or a STA 104.

The ranging operation 700 begins with the first wireless device 702a transmitting an initial fine timing measurement (IFTMR) request frame 704 at time $t_{0,1}$. Responsive to successfully receiving the IFTMR frame 704 at time $t_{0,2}$, the second wireless device 702b responds by transmitting a fine timing measurement (IFTM) frame 706 at time $t_{0,3}$, which the first wireless device 702a receives at time $t_{0,4}$. In the example of FIG. 7, the first wireless device 702a may be referred to as an initiating station (ISTA) and the second wireless device 702b may be referred to as a responding station (RSTA). The IFTMR request frame 704 and IFTM frame 706 may carry FTM parameters specifying various characteristics of the ranging operation 700 (such as the supported capabilities of each wireless device 702a and 70b). Accordingly, the initial exchange of IFTMR and IFTM frames between an ISTA and an RSTA may be referred to as a negotiation procedure.

The first wireless device 702a and the second wireless device 702b then exchange one or more ranging NDPs (referred to hereinafter simply as "NDPs") that can be used to estimate a range or distance between the wireless devices 702a and 702b. For example, at time $t_{1,1}$, the first wireless device 702a transmits an NDP announcement (NDPA) 708, which the second wireless device 702b receives at time $t_{1,2}$. The NDPA 708 signals to the second wireless device 702b that the first wireless device 702a is about to transmit a NDP immediately thereafter (such as after a SIFS duration). Then, at time $t_{1,3}$, the first wireless device 702a transmits an NDP 710. The first wireless device 702a records the time $t_{1,3}$ as the time of departure (TOD) of the NDP 710. The second wireless device 702b receives the NDP 710 at time $t_{1,4}$ and records the time $t_{1,4}$ as the time of arrival (TOA) of the NDP 710.

The second wireless device 702b transmits an NDP 712, at time $t_{2,1}$, immediately after receiving the NDP 710 (such as after a SIFS duration). The second wireless device 702b records the time $t_{2,1}$ as the TOD of the NDP 712. The first wireless device 702a receives the NDP 712 at time $t_{2,2}$ and records the time $t_{2,2}$ as the TOA of the NDP 712. Thereafter, at time $t_{2,3}$, the second wireless device 702b transmits a location management report (LMR) 714 carrying ranging information or feedback. For example, the LMR 714 may include or indicate the TOA of the NDP 710 and the TOD of the NDP 712. The first wireless device 702a receives the LMR 714 at time $t_{2,4}$ and determines a range of the second wireless device 702b based on the TOAs and TODs of the NDPs 710 and 712. For example, the first wireless device 702a may determine the range of the second wireless device 702b based on a round trip time (RTT) associated with the NDPs 710 and 712.

Ranging operations (such as the ranging operation 700 of FIG. 7) may be used in various proximity-based applications such as, for example, unlocking a vehicle with a mobile phone. A wireless communication device within the mobile phone may communicate with a wireless communication device within the vehicle to perform FTM-based ranging operations such as described with respect to FIG. 7. For example, the vehicle may determine its distance to the mobile phone by exchanging ranging NDPs with the mobile phone. The vehicle may unlock its doors (or other compartments) if it determines that the mobile phone is within a threshold proximity of the vehicle. As described with reference to FIG. 7, distance calculations are based on TOAs and TODs of the ranging NDPs exchanged between an ISTA (such as the vehicle) and an RSTA (such as the mobile phone). In some implementations, a wireless communication device may determine the TOA of an incoming PPDU (such as a ranging NDP) based, at least in part, on the time at which the wireless communication device completes reception of an LTF field of the PPDU. The LTF field includes one or more LTF sequences modulated on a number (N) of subcarriers.

FIG. 8A shows a frequency diagram of an example LTF sequence 800 usable for communications between wireless communication devices. The LTF sequence 800 is a frequency-domain representation of an LTF symbol. As shown in FIG. 8A, a non-zero modulation symbol is modulated on each of the N subcarriers associated with the LTF sequence 800. Each modulation symbol may represent a number or pattern of bit values that depends on the type of modulation scheme being used. For example, modulation symbols mapped to a binary phase shift keying (BPSK) constellation may each represent a single bit (0 or 1). Similarly, modulation symbols mapped to a quadrature phase shift keying (QPSK) constellation may each represent a two-bit pattern (00, 01, 10, or 11). The sequence of modulation symbols mapped across all N subcarriers is collectively referred to as an "LTF sequence."

LTF sequences conforming to existing versions of the IEEE 802.11 standard are encoded or modulated based on deterministic functions. In other words, a wireless communication device with knowledge of the function used to generate the LTF sequence (such as defined by the IEEE 802.11 standard) may observe a portion of an LTF sequence and determine or predict the remainder of the LTF sequence based on the observed portion. FIG. 8B shows a timing diagram depicting an example LTF signal 810 usable for communications between wireless communication devices. The LTF signal 810 may be a time-domain representation of the LTF sequence 800 depicted in FIG. 8A. An inverse Fourier transform may be used to map various modulation symbols spanning the bandwidth of the frequency-domain LTF sequence 800 to various portions of the time-domain LTF signal 810. For example, an inverse discrete Fourier transform (IDFT) produces a time-varying signal by summing discrete samples of complex exponential waveforms of varying amplitudes and phases representative of the modulation symbols. As a result, a beginning portion 801 of the time-domain LTF signal 810 may carry information associated with modulation symbols spread throughout the bandwidth of the frequency-domain LTF sequence 800.

Aspects of the present disclosure recognize that an attacker may intercept a portion of the LTF signal 810 (such as the beginning portion 801) transmitted by a transmitting device to a receiving device. The attacker may then determine or predict the remainder of the LTF signal 801 based on the intercepted portion. For example, the attacker may use a deterministic function to predict the remainder of the LTF sequence 800 based on the values of the modulation symbols carried on the intercepted portion. Alternatively, or in addition, the attacker may use a linear minimum mean square error (MMSE) estimate to predict the remainder of the time-domain signal 810 based on samples of the intercepted portion. The attacker may then transmit a copy of a tail portion 802 of the LTF signal 810 to the receiving device before the transmitting device has completed its transmission of the original LTF signal 810. Accordingly, the attacker may trick the receiving device into thinking the transmitting device is closer than it actually is.

Figure 9A:
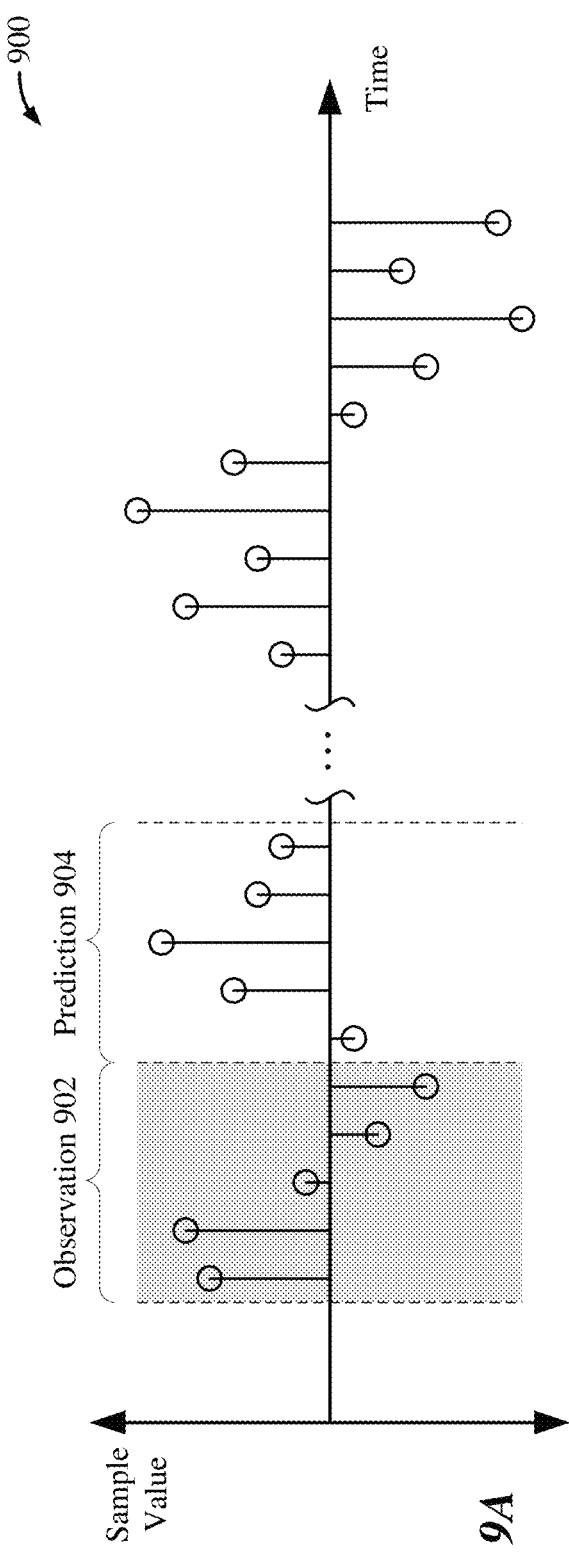
FIGS. 9A and 9B show timing diagrams depicting an example operation for predicting portions of an LTF signal based on linear minimum mean square error (MMSE) estimates.
Figure 9B:
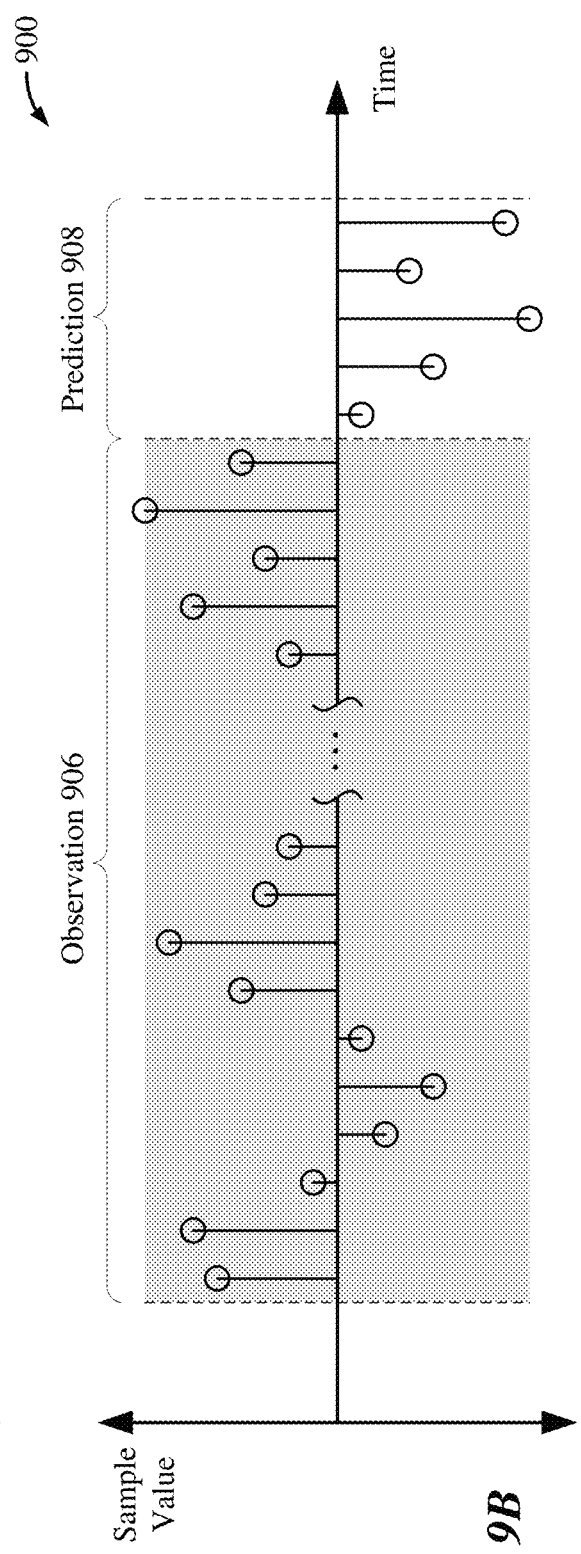

FIGS. 9A and 9B show timing diagrams depicting an example operation for predicting portions of an LTF signal 900. With reference for example to FIG. 8B, the LTF signal 900 may be one example of the time-domain LTF signal 810. The LTF signal 900 may be transmitted by a transmitting device to a receiving device. In some implementations, the LTF signal 900 may be observed and predicted by a device other than the intended receiving device. In some aspects, the prediction operation may be performed over multiple iterations.

As described above, the LTF signal 900 represents a bandlimited signal. Thus, due to an inherent property of Fourier transforms, there may be some degree of correlation among consecutive samples of the LTF signal 900. More specifically, samples that are closer in time may exhibit a higher degree of correlation than samples that are further apart. Aspects of the present disclosure recognize that an attacker may capitalize on this correlation to spoof an LTF signal. With reference for example to FIG. 9A, an attacker may observe or intercept a portion 902 of the LTF signal 900 and predict a following portion 904 of the LTF signal 900 based on a linear MMSE estimate. The attacker may continue observing more of the LTF signal 900 and predicting subsequent portions until, as shown in FIG. 9B, the attacker predicts a tail portion 908 of the LTF signal 900 based on an observed portion 906 up to that point. As described with reference to FIG. 8B, the attacker may transmit a copy of the tail portion 908 to the receiving device, for example, trick the receiving device into thinking the transmitting device is closer than it actually is.

Figure 10:
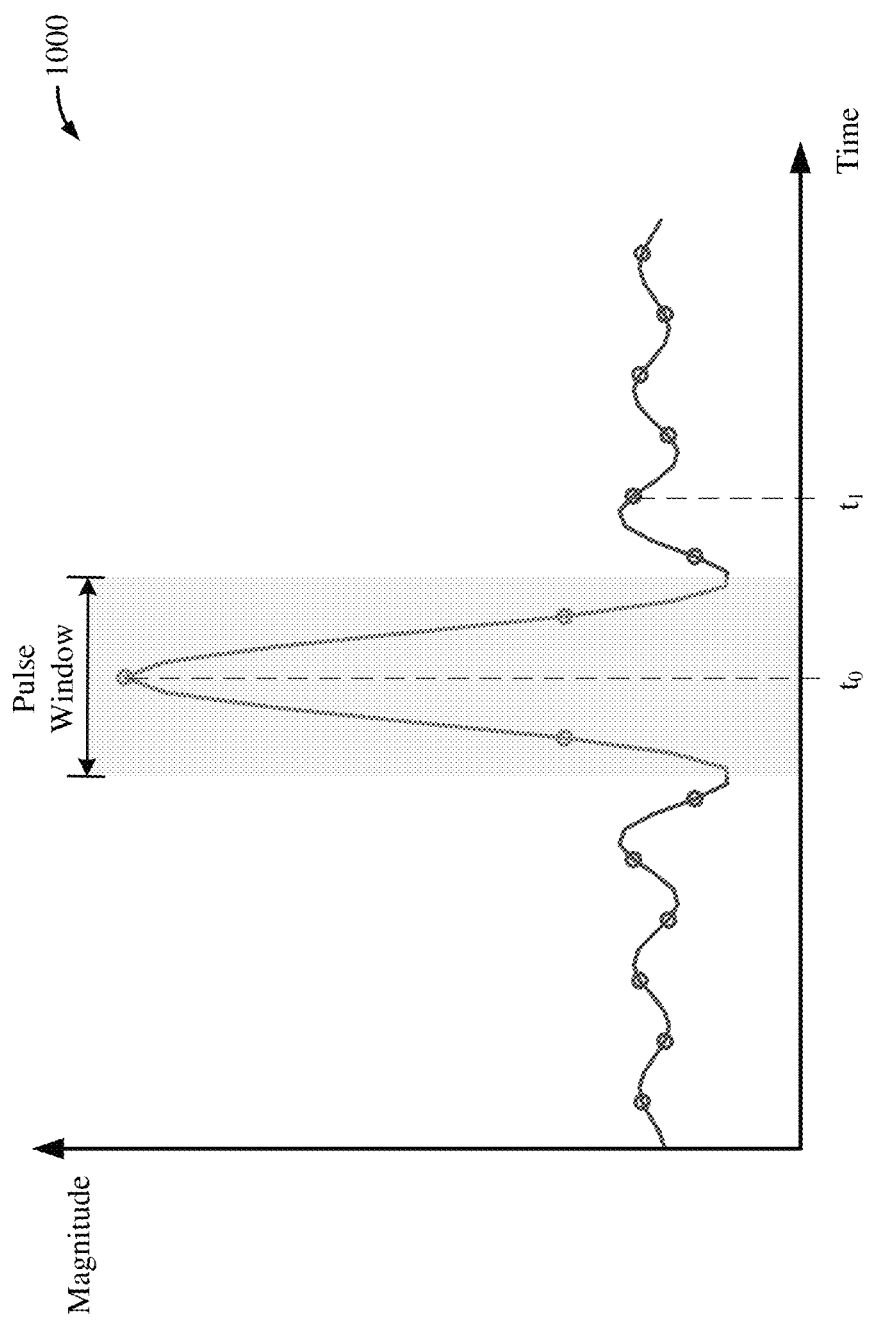
FIG. 10 shows a timing diagram depicting an example waveform of an LTF signal.

FIG. 10 shows a timing diagram depicting an example waveform 1000 of an LTF signal. In some implementations, the LTF signal may be one example of the LTF signal 900 of FIGS. 9A and 9B or the LTF signal 810 of FIG. 8B. More specifically, the example waveform 1000 may represent a component waveform of the LTF signal. As described with reference to FIGS. 8A and 8B, an IDFT may convert the LTF sequence 800 to the LTF signal 810 by summing discrete samples of complex waveforms representative of the modulation symbols. Thus, an LTF signal represents a combination of multiple component waveforms (such as the waveform 1000). As shown in FIG. 10, the waveform 1000 has a pronounced pulse (shown encapsulated within a pulse window) that peaks at time to. The pulse of waveform 1000 contributes heavily to one or more samples of the LTF signal. With reference for example to FIGS. 9A and 9B, a sample of the waveform 1000 taken at time to may coincide with any of the discrete samples of the LTF signal 900.

Because LTF signals are bandlimited, each component waveform may leak information into the past and the future. For example, as shown in FIG. 10, the waveform 1000 models a sinc function. In other words, the waveform 1000 does not consist of a single isolated pulse, bounded by the pulse window, but continuously varies over time even outside the pulse window. These further variations (or "bounces") in the waveform 1000 also contribute to one or more samples of the LTF signal. For example, a sample of the waveform 1000 taken at time $t_1$ may contribute to the magnitude of another sample of the LTF signal. Thus, an attacker may use the information carried in the bounces of the waveform 1000 to predict one or more future samples of the LTF signal. As described above, multiple overlapping waveforms are summed to create an LTF signal. Thus, the more waveforms of an LTF signal the attacker detects, the more accurately the attacker can predict future samples of the LTF signal. To improve the security of an LTF signal, it is desirable to reduce the amount of correlation between time-domain samples, for example, by reducing the magnitudes of the bounces in each component waveform of the LTF signal.

Various aspects relate generally to LTFs used in wireless communications, and more particularly, to generating secure LTFs that are resilient to attack. In some aspects, a transmitting device may perform windowing on a secure LTF, in the frequency domain, so that the resulting time-domain LTF signal is difficult, if not impossible, to predict by any device that observes a portion of the LTF signal. For example, the transmitting device may apply a window function to a sequence of frequency-domain modulation symbols associated with the secure LTF. The window function reduces the magnitude of the corresponding waveform in the time domain before and after a given window of time (coinciding with a pulse width of the LTF signal). In some aspects, the transmitting device may negotiate the windowing of secure LTFs with a receiving device based on IFTM frames and IFMTR frames exchanged at the start of an FTM procedure. In some other aspects, the transmitting device may dynamically or adaptively perform windowing on secure LTFs. In such aspects, the transmitting device may indicate whether windowing is performed on a secure LTF based on information carried in a signal field of a PPDU that includes the secure LTF.

Particular implementations of the subject matter described in this disclosure can be implemented to realize one or more of the following potential advantages. In some implementations, the described techniques can be used to improve the security of LTFs used in wireless communications. Aspects of the present disclosure recognize that, because an LTF signal is bandlimited, there may be some degree of correlation among samples of the LTF signal occurring consecutively in time. As a result, an attacker (or unintended receiving device) may receive a portion of an LTF signal and determine or predict a subsequent portion of the LTF signal, for example, based on a linear MMSE estimate. A sophisticated attacker may even copy or spoof the LTF signal before the transmitting device has finished transmitting the original LTF signal to the receiving device. For example, the attacker may transmit the spoofed LTF signal to the receiving device to cause errors in channel or ranging measurements by the receiving device. By windowing the transmitted LTF signal, aspects of the present disclosure may reduce the degree of correlation between successive samples of the LTF signal and thus prevent an attacker from predicting the remainder of the LTF signal from a received portion. Although a windowed LTF signal may perform poorly for certain applications (such as ranging), by performing the windowing dynamically, aspects of the present disclosure may balance the security of the LTF signal with various other considerations (such as ranging performance).

Figure 11:
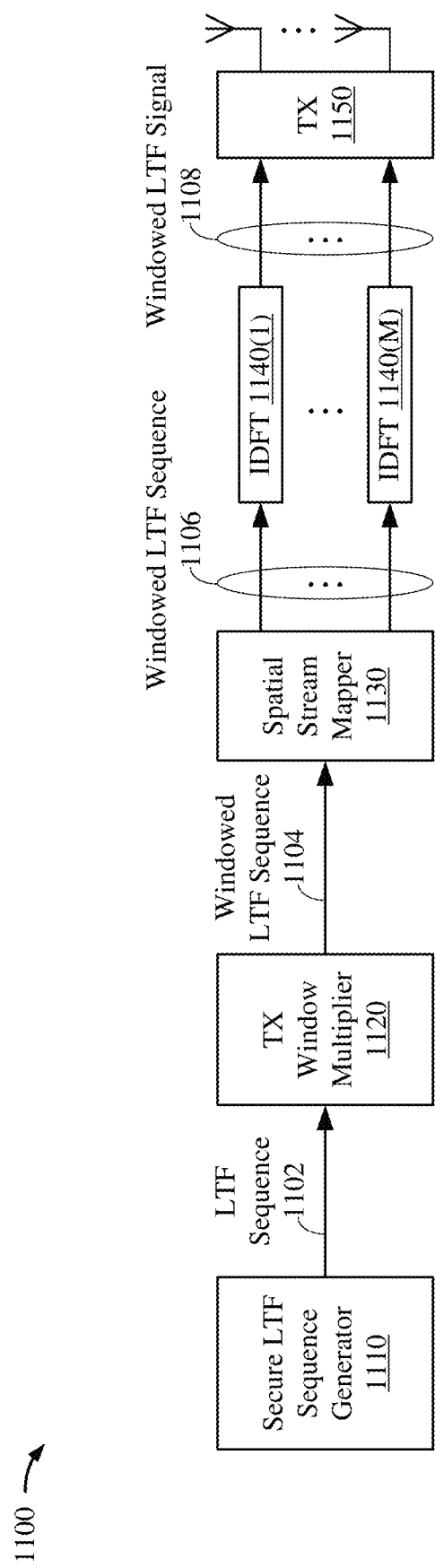
FIG. 11 shows a block diagram of an example transmit (TX) processing chain of a wireless communication device according to some implementations.

FIG. 11 shows a block diagram of an example transmit (TX) processing chain 1100 of a wireless communication device according to some implementations. In some implementations, the TX processing chain 1100 may be configured to transmit a windowed LTF signal 1108 representing an LTF field of a PPDU. For example, the PPDU may be an FTM frame. In some implementations, the wireless communication device may be an AP such as APs 102 or 602 of FIGS. 1 and 6, respectively. In some other implementations, the wireless communication device may be a STA such as STAs 104 or 604 of FIGS. 1 and 6, respectively. With reference for example to FIG. 5, the TX processing chain may include portions of the modem 502 and the radio 504.

The TX processing chain 1100 includes a secure LTF sequence generator 1110, a TX window multiplier 1120, a spatial stream mapper 1130, a number (M) of IDFTs 1140 (1)-1140(M), and a transmitter (TX) 1150. The secure LTF sequence generator 1110 is configured to generate an LTF sequence 1102. As described with reference to FIG. 8A, the LTF sequence 1102 may include a sequence of non-zero modulation symbols representing an LTF symbol. In some implementations, the secure LTF sequence generator 1110 may generate the LTF sequence 1102 based on a pseudorandom bit sequence. More specifically, the LTF sequence generator 1110 may select a pattern of LTF bits, corresponding to a subset of the pseudorandom bit sequence, to be modulated onto a number (N) of subcarriers to produce the LTF sequence 1102. Using a pseudorandom bit sequence for the LTF sequence 1102 increases the difficulty of decoding or replicating the LTF sequence 1102 by any device other than the intended receiving device.

In some implementations, the secure LTF sequence generator 1110 may modulate the pattern of LTF bits based on a quadrature amplitude modulation (QAM) scheme. In other words, each modulation symbol of the LTF sequence 1102 may represent a respective QAM symbol. Higher-order modulation schemes (higher than QPSK) are generally more sensitive to intercarrier interference (ICI), which tends to degrade the performance of orthogonal frequency-division multiplexing (OFDM) transmissions. However, aspects of the present disclosure recognize that the presence of ICI in LTF transmissions increases the difficulty of decoding or replicating the LTF sequence. In some aspects, the secure LTF sequence generator 1110 may implement a 16-QAM or higher-order modulation scheme (such as 64-QAM or 256-QAM, among other examples) to balance the advantages (increase decoding difficulty) with the disadvantages (degrade OFDM performance) of ICI.

In some implementations, the TX window multiplier 1120 may perform windowing on the LTF sequence 1102. For example, the TX window multiplier 1120 may multiply the LTF sequence 1102 by a window function to produce a windowed LTF sequence 1104. Example suitable window functions include rectangular windows, raised cosine (RC) windows, Planck-taper windows, and flat top windows, among other examples. Windowing alters the magnitudes of the modulation symbols on a per-tone basis so that the magnitudes of symbols modulated on tones further away from a center frequency are reduced in a tapered fashion. With reference for example to FIG. 10, windowing may reduce the magnitudes of the bounces in waveforms resulting from the conversion of the windowed LTF sequence 1104 from the frequency domain to the time domain (such as the waveform 1000). As described above, windowing may improve the security of a resulting LTF signal (such as the windowed LTF signal 1108). However, reducing the information carried in each component waveform may degrade the ranging performance of the LTF signal. Thus, in some implementations, the TX window multiplier 1120 may implement a window function that balances the security and ranging performance of an LTF signal.

The spatial stream mapper 1130 maps the windowed LTF sequence 1104 onto a number (M) of spatial streams to produce a spatially-mapped windowed LTF sequence 1106. For example, the spatial stream mapper 1130 may apply a spatial mapping matrix to the set of N modulation symbols of the windowed LTF sequence 1104. In some implementations, the spatial stream mapper 1130 may add phase rotations or offsets to the various spatial streams associated with the windowed LTF sequence 1106. For example, the phase offsets may prevent unintentional beamforming at the receiving device. Unintentional beamforming may result from constructive (or destructive) interference of multiple spatial streams caused by multipath propagation. In some aspects, the spatial stream mapper 1130 may apply non-cyclic phase rotations to the modulation symbols modulated on the various spatial streams. As a result, the phase rotations applied to one of the spatial streams cannot be determined by cyclically delaying or shifting the phase rotations applied to another spatial stream (as is the case with cyclic shift diversity (CSD)).

The IDFTs 1140(1)-1140(M) convert the windowed LTF sequence 1106, on the M spatial streams, from the frequency domain to the time domain. For example, each IDFT 1140 may produce a respective sequence of time-varying samples representative of the windowed LTF sequence 1106 (such as illustrated in FIG. 8B). The sequence of samples output by the IDFTs 1140(1)-1140(M) represents a time-domain windowed LTF signal 1108. In some implementations, a cyclic prefix may be appended to the beginning of the windowed LTF signal 1108. A cyclic prefix is a repetition of a number (L) of samples taken from the end of a time-domain signal. In OFDM communications, the cyclic prefix mitigates multipath effects and provides a guard interval that reduces intersymbol interference (ISI) between consecutive OFDM symbols. However, aspects of the present disclosure recognize that because the cyclic prefix includes information from the end of the time-domain signal, an attacker may use this information to predict the tail portion of the signal (such as described with reference to FIGS. 9A and 9B). Thus, in some other implementations, a cyclic prefix may not be added to the windowed LTF signal 1108.

The windowed LTF signal 1108 is provided to the transmitter 1150 for transmission, over a wireless channel, to a receiving device. The transmitter 1150 may include one or more power amplifiers to amplify the LTF signal 1108 on each of the spatial streams $SS_1$-$SS_M$ for transmission via at least M transmit antennas. As described above, the windowing performed by the TX window multiplier 1120 reduces the amount of correlation between samples of the windowed LTF signal 1108. As a result, the windowed LTF signal 1108 may be difficult, if not impossible, to predict by any device that observes a portion of the LTF signal 1108.

Aspects of the present disclosure recognize that windowing of secure LTF transmissions may not be supported by some devices or applications. Thus, in some implementations, a transmitting device and a receiving device may negotiate windowing capabilities prior to transmitting secure LTF signals. In some aspects, a transmitting device may signal an intent to perform windowing on LTF signals to be transmitted to a receiving device and the receiving device may indicate whether it can receive windowed LTF signals from the transmitting device. In some other aspects, a receiving device may signal a request for windowing to be performed on LTF signals transmitted by a transmitting device and the transmitting device may indicate whether it can transmit windowed LTF signals to the receiving device.

Figure 12A:
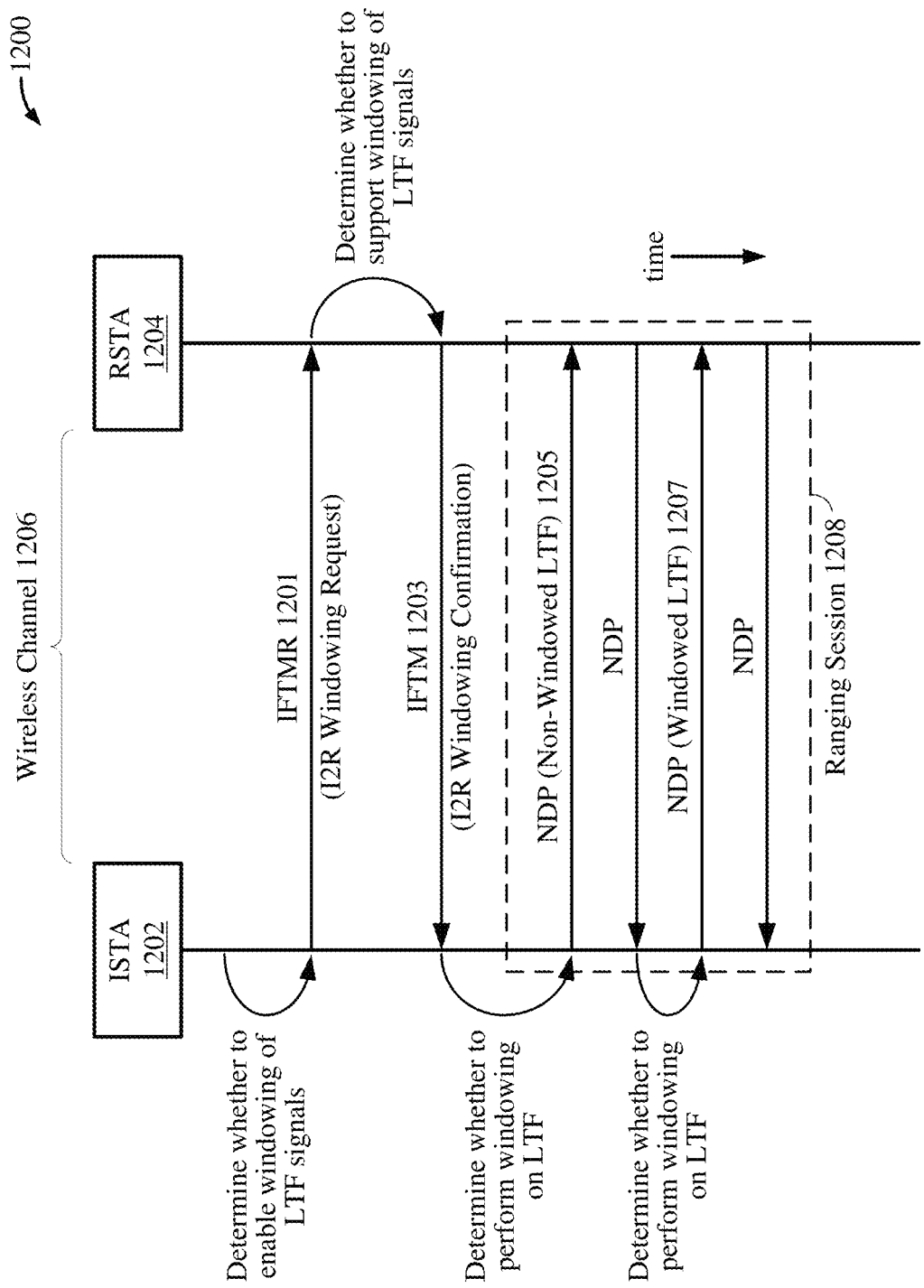
FIG. 12A shows a sequence diagram depicting an example message exchange between an initiating station (ISTA) and a responding station (RSTA) performing a fine timing measurement (FTM) procedure according to some implementations.

FIG. 12A shows a sequence diagram 1200 depicting an example message exchange between an ISTA 1202 and an RSTA 1204 performing an FTM procedure according to some implementations. In some implementations, the FTM procedure may be one example of the ranging operation 700 shown in FIG. 7. The FTM procedure is conjunctively performed by the ISTA 1202 and the RSTA 1204, which may each be an example of a STA (such as one of the STAs 104 or 604 of FIGS. 1 and 6, respectively) or an AP (such as one of the APs 102 or 602 of FIGS. 1 and 6, respectively).

The ISTA 1202 initiates the FTM procedure by transmitting an IFTMR frame 1201, over a wireless channel 1206, to the RSTA 1204. In some implementations, prior to transmitting the IFTMR frame 1201, the ISTA 1202 may determine whether to enable windowing for LTF transmissions to the RSTA 1204. As described above, windowing may improve the security of an LTF signal at the cost of ranging performance. Accordingly, the ISTA 1202 may determine whether to enable windowing based on a number of factors such as, for example, conditions of the wireless channel 1206 or a security requirement of the application (or use case scenario) for which the FTM procedure is initiated. In some implementations, the ISTA 1202 may provide windowing information in the IFTMR frame 1201 to indicate whether it intends to perform windowing on LTF signals to be transmitted to the RSTA 1204. In some aspects, the windowing information may be carried in a ranging parameters field of the IFTMR frame 1201. In the example of FIG. 12A, the IFTMR 1201 carries windowing information signaling an intent to enable windowing of LTF signals transmitted by the ISTA 1202 (or an "I2R windowing request").

The RSTA 1204 responds to the IFTMR frame 1201 by transmitting an IFTM frame 1203 back to the ISTA 1202. If the IFTMR frame 1201 carries windowing information indicating an I2R windowing request, the RSTA 1204 may determine whether it can receive windowed LTF signals from the ISTA 1202. The RSTA 1204 may determine whether windowing can be supported based on a number of factors such as, for example, conditions of the wireless channel 1206 or a security requirement of the application (or use case scenario) for which the FTM procedure is initiated. In some implementations, the RSTA 1204 may provide windowing information in the IFTM frame 1203 to indicate whether it can receive windowed LTF signals from the ISTA 1202. In some aspects, the windowing information may be included in a ranging parameters field of the IFTM frame 1203. In the example of FIG. 12A, the IFTM frame 1203 carries windowing information indicating that the RSTA 1204 is capable of receiving windowed LTF signals (or an "I2R windowing confirmation").

The ISTA 1202 may initiate a ranging session 1208 with the RSTA 1204 after receiving the IFTM frame 1203. During the ranging session 1208, the ISTA 1202 may transmit one or more ranging NDPs to the RSTA 1204, and the RSTA 1204 may respond by transmitting one or more ranging NDPs back to the ISTA 1202 (such as described with reference to FIG. 7). Each ranging NDP may conform to a PPDU format that includes an LTF field. As described with reference to FIGS. 8A and 8B, the LTF field may include a sequence of modulation symbols representing an LTF sequence which may be transmitted, in the time-domain, as an LTF signal. In some implementations, the ISTA 1202 may selectively perform windowing on LTF signals included in the NDPs based on the windowing information carried in the IFTM frame 1203. For example, the ISTA 1202 may not perform windowing on the LTF signals if the windowing information indicates that the RSTA 1204 cannot receive windowed LTF signals. In some aspects, the ISTA 1202 may perform windowing on each LTF signal transmitted to the RSTA 1204 if the windowing information indicates that the RSTA 1204 is capable of receiving windowed LTF signals.

In some other aspects, the ISTA 1202 may dynamically perform windowing on individual LTF signals transmitted to the RSTA 1204 if the windowing information indicates that the RSTA 1204 is capable of receiving windowed LTF signals. In other words, the ISTA 1202 may determine, for each NDP, whether to perform windowing on the included LTF signal. As described above, the conditions for performing windowing on LTF signals may depend on the priorities of the ISTA 1202 and the RSTA 1204 (such as security or ranging performance). However, aspects of the present disclosure recognize that the priorities of the ISTA 1202 or RSTA 1204 may change over time. For example, as channel conditions worsen, the ISTA 1202 may prioritize ranging performance over security. On the other hand, as channel conditions improve, the ISTA 1202 may prioritize security over ranging performance. Thus, in some aspects, the ISTA 1202 may determine whether to perform windowing on a given LTF signal based on an estimate of the wireless channel 1206.

Aspects of the present disclosure further recognize that the security requirements of the ISTA 1202 or RSTA 1204 may change over time. For example, the ISTA 1202 may require greater security if it detects (or suspects) that an attacker may be spoofing its LTF signals to the RSTA 1204. In some aspects, the ISTA 1202 may determine a level of security associated with the LTF signals based on an estimated range of the RSTA 1204 to the ISTA 1202. For example, the ISTA 1202 may determine or estimate the distance of the RSTA 1204 using various heuristics or other positioning techniques (referred to herein as an "alternative distance measurement"). Significant disparities between the alternative distance measurement and ranging information or feedback provided by the RSTA 1204 may be indicative of a potential attacker spoofing the LTF signals transmitted by the ISTA 1202. Thus, in some aspects, the ISTA 1202 may determine whether to perform windowing on a given LTF signal based on a current security requirement of the LTF signal or estimated range of the RSTA 1204.

In the example of FIG. 12A, the ISTA 1202 decides not to perform windowing on an LTF signal that is included in an initial ranging NDP 1205. Thus, the ISTA 1202 transmits the NDP 1205, with a non-windowed LTF signal, to the RSTA 1204. Due to changes in channel conditions or security requirements, the ISTA 1202 decides to perform windowing on an LTF signal that is included in a subsequent ranging NDP 1207. Thus, the ISTA 1202 transmits the NDP 1207, with a windowed LTF signal, to the RSTA 1204. In some implementations, the ISTA 1202 may provide dynamic windowing information in the NDPs 1205 or 1207 to dynamically indicate whether windowing is performed on the included LTF signal. For example, in some aspects, the dynamic windowing information may be carried in a signal field (such as HE-SIG-A) of the NDPs 1205 and 1207.

Figure 12B:
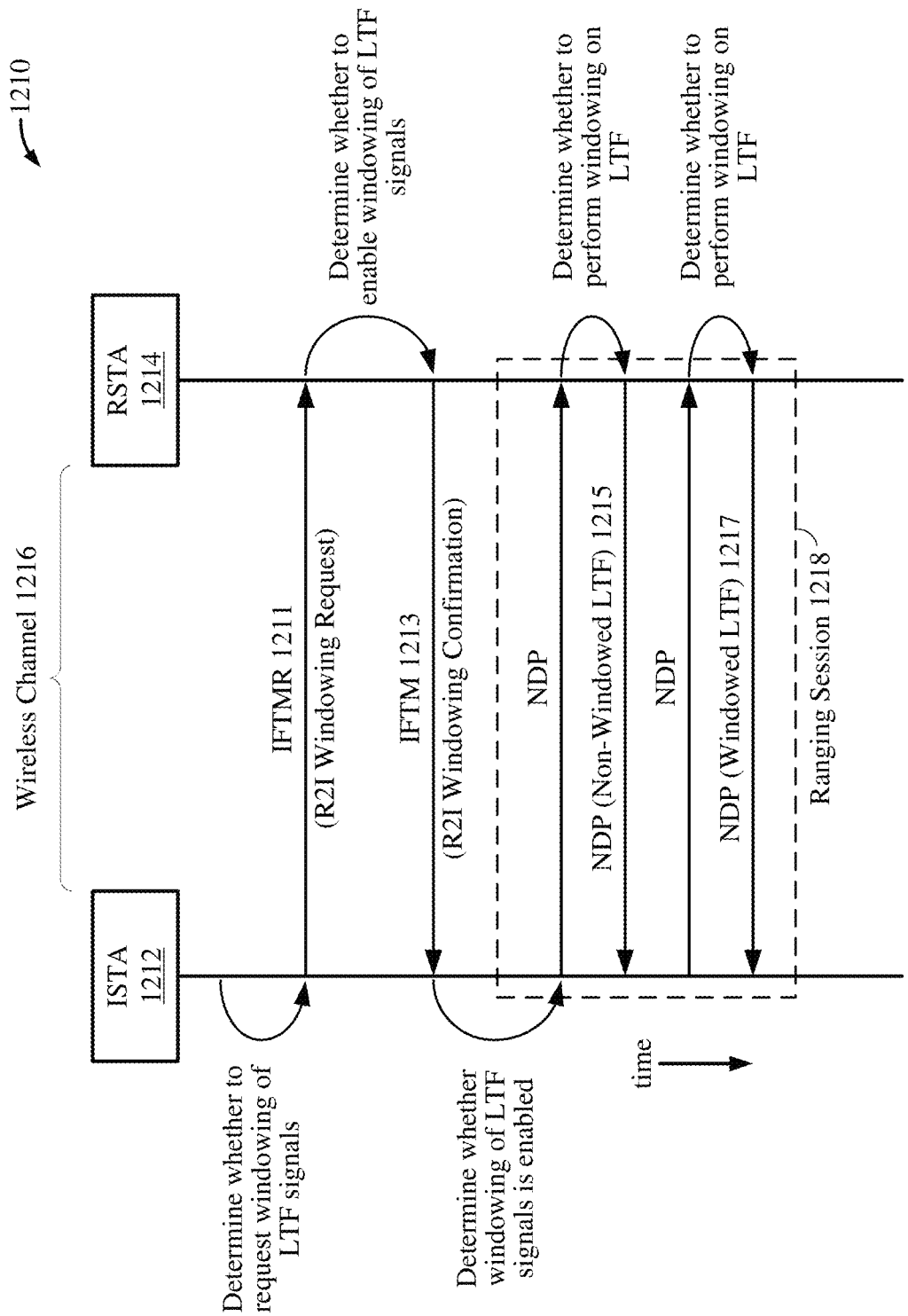
FIG. 12B shows a sequence diagram depicting an example message exchange between an ISTA and an RSTA performing an FTM procedure according to some implementations.

FIG. 12B shows a sequence diagram 1210 depicting an example message exchange between an ISTA 1212 and an RSTA 1214 performing an FTM procedure according to some implementations. In some implementations, the FTM procedure may be one example of the ranging operation 700 shown in FIG. 7. The FTM procedure is conjunctively performed by the ISTA 1212 and the RSTA 1214, which may each be an example of a STA (such as one of the STAs 104 or 604 of FIGS. 1 and 6, respectively) or an AP (such as one of the APs 102 or 602 of FIGS. 1 and 6, respectively).

The ISTA 1212 initiates the FTM procedure by transmitting an IFTMR frame 1211, over a wireless channel 1216, to the RSTA 1214. In some implementations, prior to transmitting the IFTMR frame 1211, the ISTA 1212 may determine whether to request windowing of LTF transmissions by the RSTA 1214. As described above, windowing may improve the security of an LTF signal at the cost of ranging performance. Accordingly, the ISTA 1212 may determine whether to request windowing based on a number of factors such as, for example, conditions of the wireless channel 1216 or a security requirement of the application (or use case scenario) for which the FTM procedure is initiated. In some implementations, the ISTA 1212 may provide windowing information in the IFTMR frame 1211 to indicate whether windowing is requested for LTF signals transmitted by the RSTA 1214. In some aspects, the windowing information may be carried in a ranging parameters field of the IFTMR frame 1211. In the example of FIG. 12B, the IFTMR 1211 carries windowing information signaling a request to enable windowing of LTF signals transmitted by the RSTA 1214 (or an "R2I windowing request").

The RSTA 1214 responds to the IFTMR frame 1211 by transmitting an IFTM frame 1213 back to the ISTA 1212. If the IFTMR frame 1211 carries windowing information indicating an R2I windowing request, the RSTA 1214 may determine whether it can perform windowing on LTF signals to be transmitted to the ISTA 1212. The RSTA 1214 may determine whether windowing can be supported based on a number of factors such as, for example, conditions of the wireless channel 1216 or a security requirement of the application (or use case scenario) for which the FTM procedure is initiated. In some implementations, the RSTA 1214 may provide windowing information in the IFTM frame 1213 to indicate whether it can transmit windowed LTF signals to the ISTA 1212. In some aspects, the windowing information may be included in a ranging parameters field of the IFTM frame 1213. In the example of FIG. 12B, the IFTM frame 1213 carries windowing information indicating that the RSTA 1214 is capable of transmitting windowed LTF signals (or an "R2I windowing confirmation").

The ISTA 1212 may initiate a ranging session 1218 with the RSTA 1214 after receiving the IFTM frame 1213. During the ranging session 1218, the ISTA 1212 may transmit one or more ranging NDPs to the RSTA 1214, and the RSTA 1214 may respond by transmitting one or more ranging NDPs back to the ISTA 1212. Each ranging NDP may conform to a PPDU format that includes an LTF field. As described with reference to FIGS. 8A and 8B, the LTF field may include a sequence of modulation symbols representing an LTF sequence which may be transmitted, in the time-domain, as an LTF signal. In some implementations, the RSTA 1214 may selectively perform windowing on LTF signals included in the NDPs based on the windowing information carried in the IFTM frame 1213. For example, the RSTA 1214 may not perform windowing on the LTF signals if the windowing information indicates that the RSTA 1214 cannot transmit windowed LTF signals. In some aspects, the RSTA 1214 may perform windowing on each LTF signal transmitted to the ISTA 1212 if the windowing information indicates that the RSTA 1214 is capable of transmitting windowed LTF signals.

In some other aspects, the RSTA 1214 may dynamically perform windowing on individual LTF signals transmitted to the ISTA 1212 if the windowing information indicates that the RSTA 1214 is capable of transmitting windowed LTF signals. In other words, the RSTA 1214 may determine, for each NDP, whether to perform windowing on the included LTF signal. As described above, the conditions for performing windowing on LTF signals may depend on the priorities of the ISTA 1212 and the RSTA 1214 (such as security or ranging performance). However, aspects of the present disclosure recognize that the priorities of the ISTA 1212 or RSTA 1214 may change over time. For example, as channel conditions worsen, the RSTA 1214 may prioritize ranging performance over security. On the other hand, as channel conditions improve, the RSTA 1214 may prioritize security over ranging performance. Thus, in some aspects, the RSTA 1214 may determine whether to perform windowing on a given LTF signal based on an estimate of the wireless channel 1216.

Aspects of the present disclosure further recognize that the security requirements of the ISTA 1212 or RSTA 1214 may change over time. For example, the RSTA 1214 may require greater security if it detects (or suspects) that an attacker may be spoofing its LTF signals to the ISTA 1212. In some aspects, the RSTA 1214 may determine a level of security associated with the LTF signals based on an estimated range of the ISTA 1212 to the RSTA 1214. For example, the RSTA 1214 may determine or estimate the distance of the ISTA 1212 using various heuristics or other positioning techniques. Significant disparities between the alternative distance measurement and ranging information or feedback provided by the ISTA 1212 may be indicative of a potential attacker spoofing the LTF signals transmitted by the RSTA 1214. Thus, in some aspects, the RSTA 1214 may determine whether to perform windowing on a given LTF signal based on a current security requirement of the LTF signal or estimated range of the ISTA 1212.

In the example of FIG. 12B, the RSTA 1214 decides not to perform windowing on an LTF signal that is included in an initial ranging NDP 1215. Thus, the RSTA 1214 transmits the NDP 1215, with a non-windowed LTF signal, to the ISTA 1212. Due to changes in channel conditions or security requirements, the RSTA 1214 decides to perform windowing on an LTF signal that is included in a subsequent ranging NDP 1217. Thus, the RSTA 1214 transmits the NDP 1217, with a windowed LTF signal, to the ISTA 1212. In some implementations, the RSTA 1214 may provide dynamic windowing information in the NDPs 1215 or 1217 to dynamically indicate whether windowing is performed on the included LTF signal. For example, in some aspects, the dynamic windowing information may be carried in a signal field (such as HE-SIG-A) of the NDPs 1215 and 1217.

FIG. 13 shows an example ranging parameters field 1300 for an FTM negotiation frame. With reference for example to FIGS. 12A and 12B, the FTM negotiation frame may be one example of the IFTMR frames 1201 and 1211 or the IFTM frames 1203 and 1213. The ranging parameters field 1300 includes a number of legacy subfields spanning bit positions B0-B47. As used herein, the term "legacy" refers to any field or subfield of an FTM negotiation frame defined by existing versions of the IEEE 802.11az amendment to the IEEE 802.11 standard. In some implementations, the ranging parameters field 1300 may include an additional octet of information (spanning bit positions B48-B55) not included in any legacy ranging parameters field. In the example of FIG. 13, the ranging parameters field 1300 includes an I2R TX window subfield in bit position B48 and an R2I TX window subfield in bit position B49. The remaining 6 bits (spanning bit positions B50-B55) of the ranging parameters field 1300 are reserved.

In some implementations, the value of the I2R TX window subfield may indicate whether a transmitting device or a receiving device supports windowing of LTF signals transmitted by an ISTA to an RSTA. For example, when the ranging parameters field 1300 is included in an IFTMR frame (such as the IFTMR frame 1201 of FIG. 12A), the value of the I2R TX window subfield may indicate whether the transmitting device (or ISTA) supports windowing of LTF signals. On the other hand, when the ranging parameters field 1300 is included in an IFTM frame (such as the IFTM frame 1203 of FIG. 12A), the value of the I2R TX window subfield may indicate whether the receiving device (or RSTA) supports windowing of LTF signals.

In some implementations, the value of the R2I TX window subfield may indicate whether a transmitting device or a receiving device supports windowing of LTF signals transmitted by an RSTA to an ISTA. For example, when the ranging parameters field 1300 is included in an IFTMR frame (such as the IFTMR frame 1211 of FIG. 12B), the value of the R2I TX window subfield may indicate whether the receiving device (or ISTA) supports windowing of LTF signals. On the other hand, when the ranging parameters field 1300 is included in an IFTM frame (such as the IFTM frame 1213 of FIG. 12B), the value of the R2I TX window subfield may indicate whether the transmitting device (or RSTA) supports windowing of LTF signals.

Figure 14:
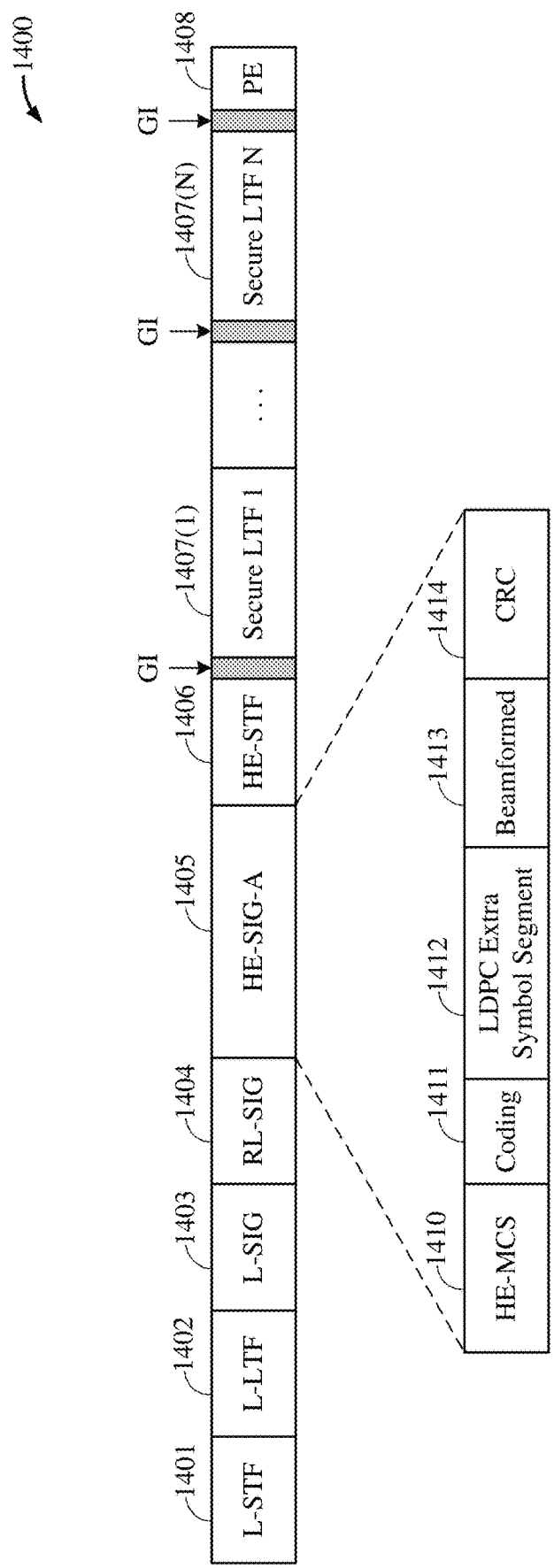
FIG. 14 shows an example ranging null data packet (NDP) according to some implementations.

FIG. 14 shows an example ranging NDP 1400 according to some implementations. In some implementations, the ranging NDP 1400 may be formatted in accordance with the high efficiency (HE) ranging NDP format or the HE trigger-based (TB) ranging NDP format defined by the IEEE 802.11az amendment to the IEEE 802.11 standard. The ranging NDP 1400 includes an L-STF 1401, an L-LTF 1402, an L-SIG 1403, an RL-SIG 1404, an HE-SIG-A 1405, an HE-STF 1406, a number (N) of secure LTF fields 1407(1)-1407(N), and a packet extension (PE) field 1408. Each of the secure LTF fields 1407(1)-407(N) may carry a secure LTF sequence. The PE field 1408 provides additional receive processing time at the end of the ranging NDP 1400. The PE field 1408 and each of the secure LTF fields 1407(1)-407(N) is immediately preceded by a zero-power guard interval (GI).

In some implementations, L-STF 1401, L-LTF 1402, L-SIG 1403, RL-SIG 1404, and HE-SIG-A 1405 may be examples of L-STF 308, L-LTF 310, L-SIG 312, RL-SIG 314, and HE-SIG-A 316, respectively, of FIG. 3A. As described with reference to FIG. 3A, HE-SIG-A 1405 carries signaling information that can be used to receive or interpret one or more other fields of the ranging NDP 1400. Aspects of the present disclosure recognize that some of the fields of HE-SIG-A 1405 do not carry relevant information for the ranging NDP 1400. Thus, in some implementations, one or more fields of HE-SIG-A 1405 may be repurposed to carry dynamic windowing information. For example, HE-SIG-A 1405 is shown to include an HE-MCS field 1410, a coding field 1411, a low-density parity-check (LDPC) extra symbol segment field 1412, a beamformed field 1413, and a cyclic redundancy check (CRC) field 1414, among other fields (not shown for simplicity).

The HE-MCS field 1410 carries 4 bits of information indicating a modulation and coding scheme (MCS) used to transmit a data field of the PPDU. However, aspects of the present disclosure recognize that the ranging NDP 1400 does not include a data field. Thus, in some implementations, the HE-MCS field 1410 may be repurposed to carry dynamic windowing information. For example, a low MCS value (such as MCS0) may be used to indicate that windowing is not performed on the secure LTFs 1407(1)-407(N), while a higher MCS value may be used to indicate that windowing is performed on the secure LTFs 1407(1)-407(N).

The coding field 1411 carries 1 bit of information indicating whether data is encoded based on a binary convolutional code (BCC) or an LDPC code. Further, the LDPC extra symbol segment field 1412 carries 1 bit of information indicating whether an LDPC extra symbol segment is present. As described above, the ranging NDP 1400 does not carry data. Thus, in some implementations, the coding field 1411 and LDPC extra symbol segment field 1412 may be repurposed to carry dynamic windowing information. For example, the value of the coding field 1411 may be set to 1 to indicate LDPC, and the value of the LDPC extra symbol segment field 1412 may be set to 0 or 1 to indicate whether windowing is performed on the secure LTFs 1407(1)-407(N).

The beamformed field 1413 carries 1 bit of information indicating whether a beamforming steering matrix is applied to the HE modulated fields of the ranging NDP 1400. However, aspects of the present disclosure recognize that secure LTFs are never beamformed. Thus, in some implementations, the beamformed field 1413 may be repurposed to carry dynamic windowing information. For example, the value of the beamformed field 1413 may be set to 0 or 1 to indicate whether windowing is performed on the secure LTFs 1407(1)-407(N).

The CRC field 1414 carries 4 bits of information that can be used to perform a cyclic redundancy check on the information carried in HE-SIG-A 1405. Aspects of the present disclosure recognize that the value of the CRC field 1414 is used to detect errors in HE-SIG-A 1405 and does not map to any signaling information. Thus, in some implementations, the CRC field 1414 may be used to carry dynamic windowing information. In some aspects, the value of the CRC field 1414 may be selectively altered to indicate whether windowing performed on the secure LTFs 1407(1)-407(N). For example, the bits of the CRC field 1414 may be flipped or inverted (representing a two's complement of the CRC field 1414) to indicate that windowing is performed or may be left unchanged to indicate that windowing is not performed.

Although not shown, for simplicity, HE-SIG-A 1405 may further include a number of reserved bits that are currently unused in the existing version of the IEEE 802.11 standard. In some implementations, one or more of the reserved bits may be repurposed to carry dynamic windowing information. For example, a reserved bit may be repurposed as a dynamic windowing bit which may be set to 0 or 1 to indicate whether windowing is performed on the secure LTFs 1407(1)-407(N).

Figure 15:
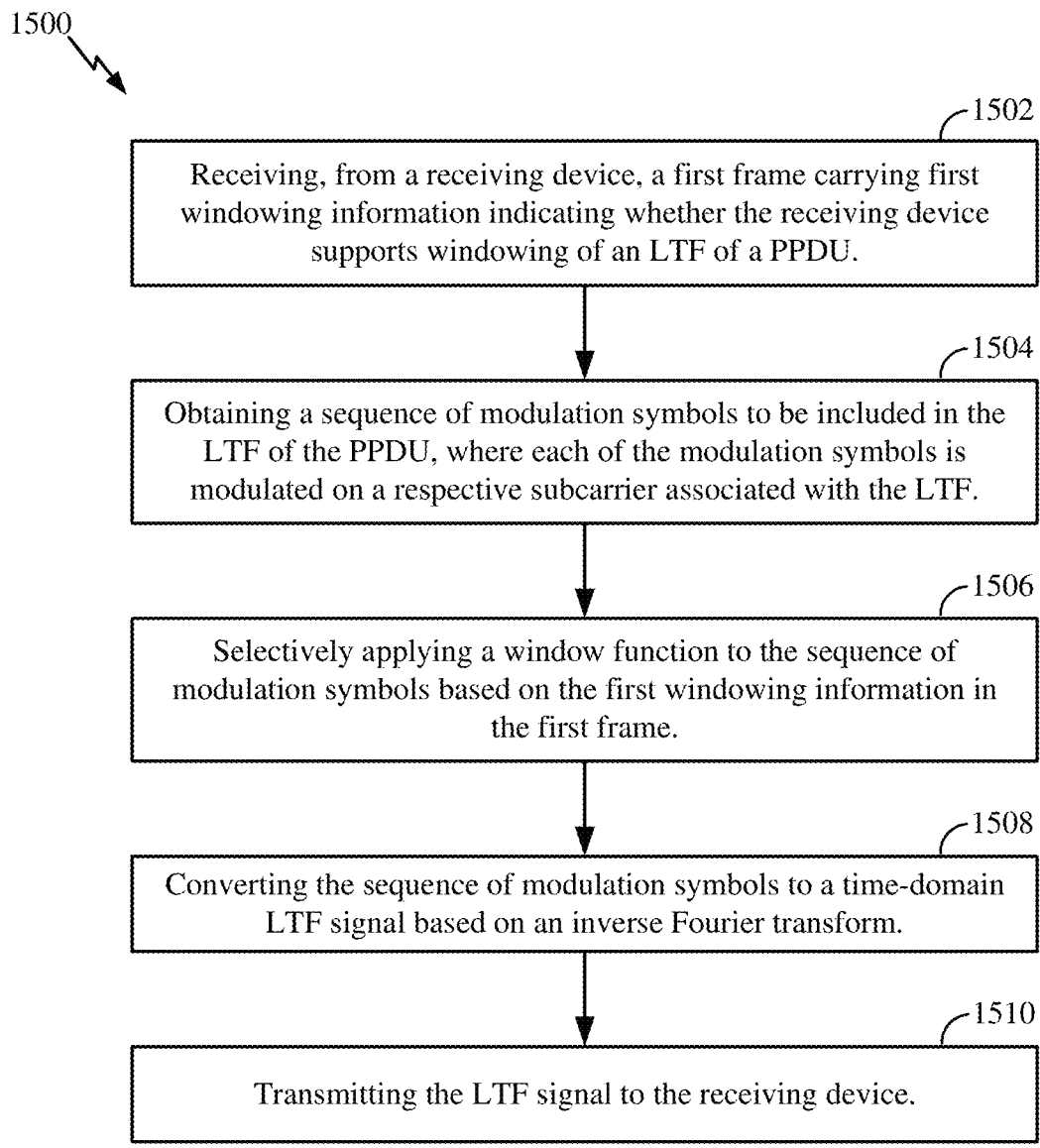
FIG. 15 shows a flowchart illustrating an example process for wireless communication that supports secure LTF TX window signaling according to some implementations.

FIG. 15 shows a flowchart illustrating an example process 1500 for wireless communication that supports secure LTF TX window signaling according to some implementations. In some implementations, the process 1500 may be performed by a wireless communication device operating as or within a network node, such as one of the STAs 104 or 604 described above with reference to FIGS. 1 and 6B, respectively. In some other implementations, the process 1500 may be performed by a wireless communication device operating as or within an AP, such as one of the APs 102 or 602 described above with reference to FIGS. 1 and 6A, respectively.

In some implementations, the process 1500 begins in block 1502 with receiving, from a receiving device, a first frame carrying first windowing information indicating whether the receiving device supports windowing of an LTF of a PPDU. In block 1504, the process 1500 proceeds with obtaining a sequence of modulation symbols to be included in the LTF of the PPDU, where each of the modulation symbols is modulated on a respective subcarrier associated with the LTF. In block 1506, the process 1500 proceeds with selectively applying a window function to the sequence of modulation symbols based on the first windowing information in the first frame. In block 1508, the process 1500 proceeds with converting the sequence of modulation symbols to a time-domain LTF signal based on an inverse Fourier transform. In block 1510, the process 1500 proceeds with transmitting the LTF signal to the receiving device. In some implementations, the transmitted LTF signal does not include a cyclic prefix.

In some implementations, the first frame may be an IFTMR frame that initiates an FTM procedure. In some aspects, the process 1500 may proceed, after the reception of the first frame in block 1502, by transmitting an IFTM frame to the receiving device responsive to receiving the IFTMR frame, where the IFTM frame carries second windowing information indicating whether the wireless communication device supports the windowing of the LTF. In some aspects, the first windowing information may be carried in a ranging parameters field of the IFTMR frame and the second windowing information may be carried in a ranging parameters field of the IFTM frame.

In some other implementations, the process 1500 may proceed, prior to the reception of the first frame in block 1502, by transmitting, to the receiving device, an IFTMR frame that initiates an FTM procedure, where the first frame is an IFTM frame that responds to the IFTMR frame. In some aspects, the IFTMR frame may carry second windowing information indicating whether the wireless communication device supports the windowing of the LTF. In some aspects, the first windowing information may be carried in a ranging parameters field of the IFTM frame and the second windowing information may be carried in a ranging parameters field of the IFTMR frame.

In some implementations, the selective application of the window function in block 1506 may include determining a range of the receiving device to the wireless communication device and determining whether to apply the window function to the sequence of modulation symbols based on the determined range. In some aspects, the range of the receiving device may be determined based on receiving, from the receiving device, ranging information indicating an estimate of the range.

In some other implementations, the selective application of the window function in block 1506 may include estimating a wireless channel over which the LTF signal is transmitted and determining whether to apply the window function to the sequence of modulation symbols based on the channel estimate. Still further, in some implementations, the selective application of the window function in block 1506 may include determining a security requirement for the LTF signal and determining whether to apply the window function to the sequence of modulation symbols based on the security requirement.

In some implementations, the window function may be applied to the sequence of modulation symbols based on the first windowing information indicating that the receiving device supports windowing of the LTF. In some aspects, the process 1500 may proceed, prior to the transmission of the transmission of the LTF signal in block 1510, by transmitting, to the receiving device, second windowing information indicating that the window function is applied to the sequence of modulation symbols. In some aspects, the second windowing information may be transmitted via a signal field of the PPDU that includes the LTF signal.

Figure 16:
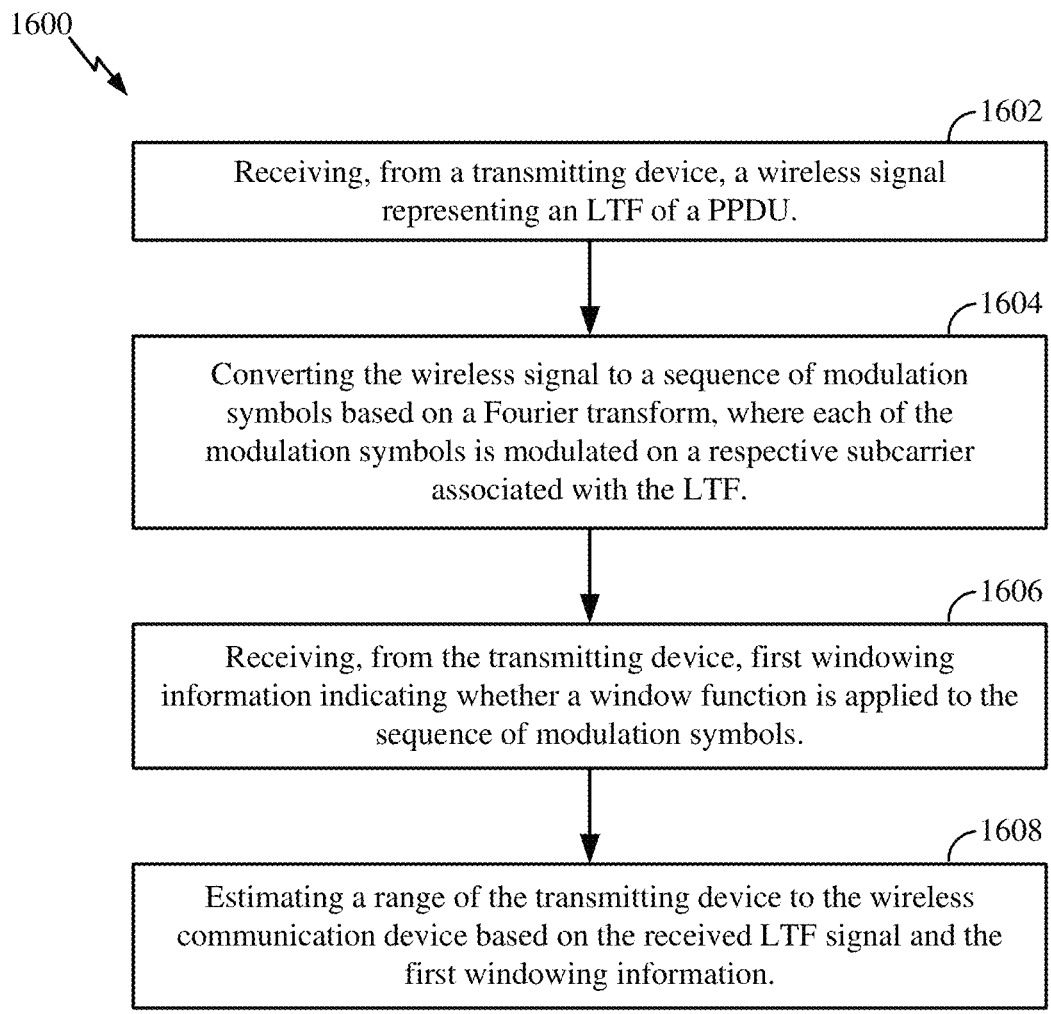
FIG. 16 shows a flowchart illustrating an example process for wireless communication that supports secure LTF TX window signaling according to some implementations.

FIG. 16 shows a flowchart illustrating an example process 1600 for wireless communication that supports secure LTF TX window signaling according to some implementations. In some implementations, the process 1600 may be performed by a wireless communication device operating as or within a network node, such as one of the STAs 104 or 604 described above with reference to FIGS. 1 and 6B, respectively. In some other implementations, the process 1600 may be performed by a wireless communication device operating as or within an AP, such as one of the APs 102 or 602 described above with reference to FIGS. 1 and 6A, respectively.

In some implementations, the process 1600 begins in block 1602 with receiving, from a transmitting device, a wireless signal representing an LTF of a PPDU. In some implementations, the received wireless signal does not include a cyclic prefix. In block 1604, the process 1600 proceeds with converting the wireless signal to a sequence of modulation symbols based on a Fourier transform, where each of the modulation symbols is modulated on a respective subcarrier associated with the LTF. In block 1606, the process 1600 proceeds with receiving, from the transmitting device, first windowing information indicating whether a window function is applied to the sequence of modulation symbols. In block 1608, the process 1600 proceeds with estimating a range of the transmitting device to the wireless communication device based on the received LTF signal and the first windowing information.

In some implementations, the first windowing information may be received via a signal field of the PPDU that includes the LTF signal. In some aspects, the first windowing information may be determined based on a value of an MCS field of the signal field. In some other aspects, the first windowing information may be determined based on values of a coding field and an LDPC extra symbol segment field of the signal field. In some aspects, the first windowing information may be determined based on a value of a beamformed field of the signal field. Still further, in some aspects, the first windowing information may be determined based on a value of a CRC field of the signal field.

In some implementations, the first windowing information may be received via an IFTMR frame that initiates an FTM procedure. In some aspects, the process 1600 may proceed, after the reception of the first windowing information in block 1606, by transmitting an IFTM frame to the transmitting device responsive to receiving the IFTMR frame, where the IFTM frame carries second windowing information indicating whether the wireless communication device supports the application of the window function by the transmitting device. In some aspects, the first windowing information may be carried in a ranging parameters field of the IFTMR frame and the second windowing information may be carried in a ranging parameters field of the IFTM frame.

In some other implementations, the process 1600 may proceed, prior to the reception of the first windowing information in block 1606, by transmitting, to the transmitting device, an IFTMR frame that initiates an FTM procedure, where the first windowing information is received via an IFTM frame that responds to the IFTMR frame. In some aspects, the IFTMR frame may carry second windowing information indicating whether the wireless communication device supports the application of the window function by the transmitting device. In some aspects, the first windowing information may be carried in a ranging parameters field of the IFTM frame and the second windowing information may be carried in a ranging parameters field of the IFTMR frame.

Figure 17:
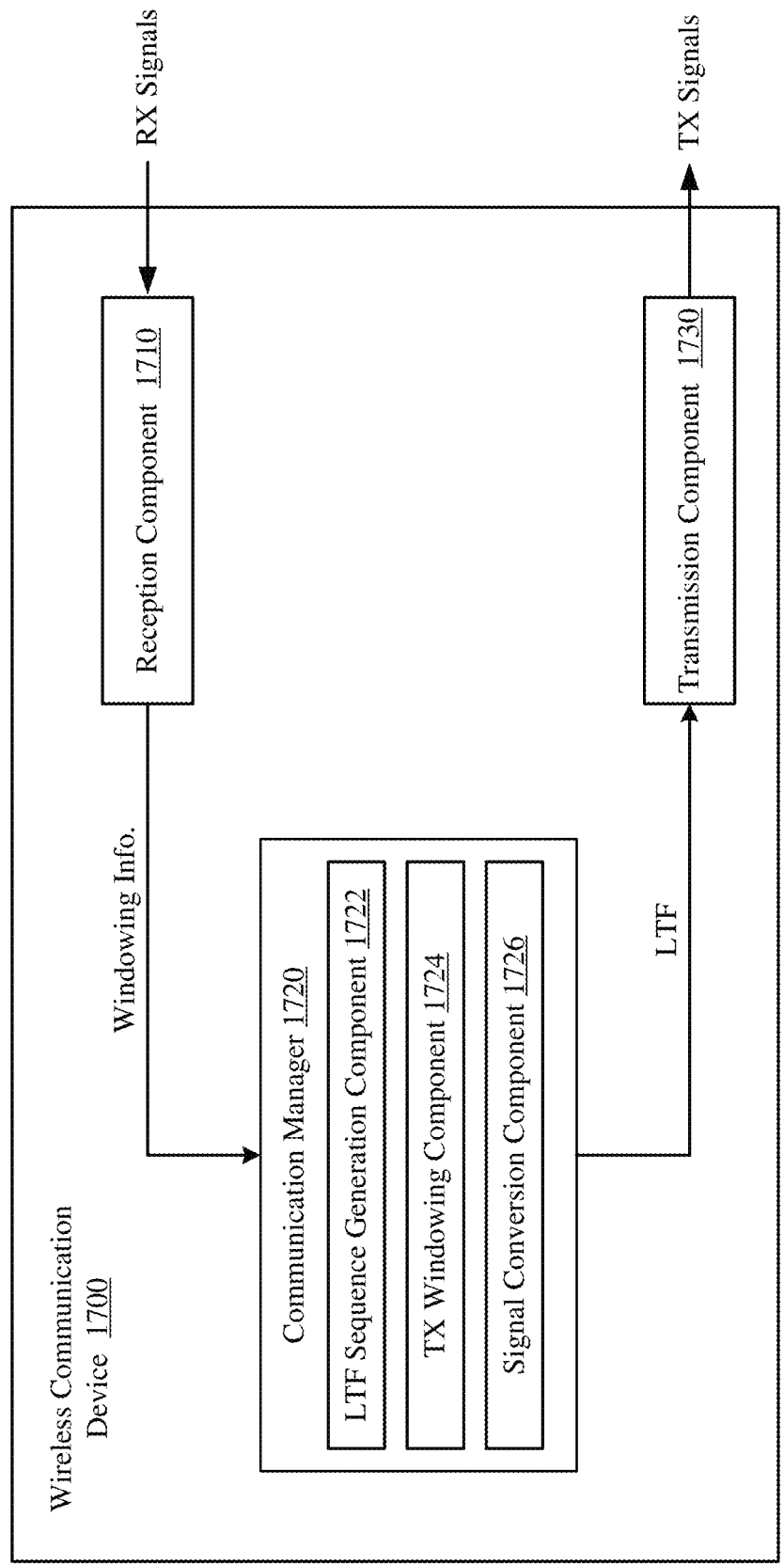
FIG. 17 shows a block diagram of an example wireless communication device according to some implementations.

FIG. 17 shows a block diagram of an example wireless communication device 1700 according to some implementations. In some implementations, the wireless communication device 1700 is configured to perform the process 1500 described above with reference to FIG. 15. The wireless communication device 1700 can be an example implementation of the wireless communication device 500 described above with reference to FIG. 5. For example, the wireless communication device 1700 can be a chip, SoC, chipset, package or device that includes at least one processor and at least one modem (for example, a Wi-Fi (IEEE 802.11) modem or a cellular modem).

The wireless communication device 1700 includes a reception component 1710, a communication manager 1720, and a transmission component 1730. The communication manager 1720 further includes an LTF sequence generation component 1722, a TX windowing component 1724, and a signal conversion component 1726. Portions of one or more of the components 1722-1726 may be implemented at least in part in hardware or firmware. In some implementations, at least some of the components 1722-1726 are implemented at least in part as software stored in a memory (such as the memory 508). For example, portions of one or more of the components 1722-1726 can be implemented as non-transitory instructions (or "code") executable by a processor (such as the processor 506) to perform the functions or operations of the respective component.

The reception component 1710 is configured to receive RX signals from a receiving device. In some implementations, the RX signals may include a first frame carrying windowing information indicating whether the receiving device supports windowing of an LTF of a PPDU. The communication manager 1720 is configured to control or manage communications with the receiving device. In some implementations, the LTF sequence generation component 1722 may obtain a sequence of modulation symbols to be included in the LTF of the PPDU, where each of the modulation symbols is modulated on a respective subcarrier associated with the LTF; the TX windowing component 1724 may selectively apply a window function to the sequence of modulation symbols based on the windowing information in the first frame; and the signal conversion component 1726 may convert the sequence of modulation symbols to a time-domain LTF signal based on an inverse Fourier transform. The transmission component 1730 is configured to transmit TX signals to the receiving device. In some implementations the TX signals may include the LTF signal.

Figure 18:
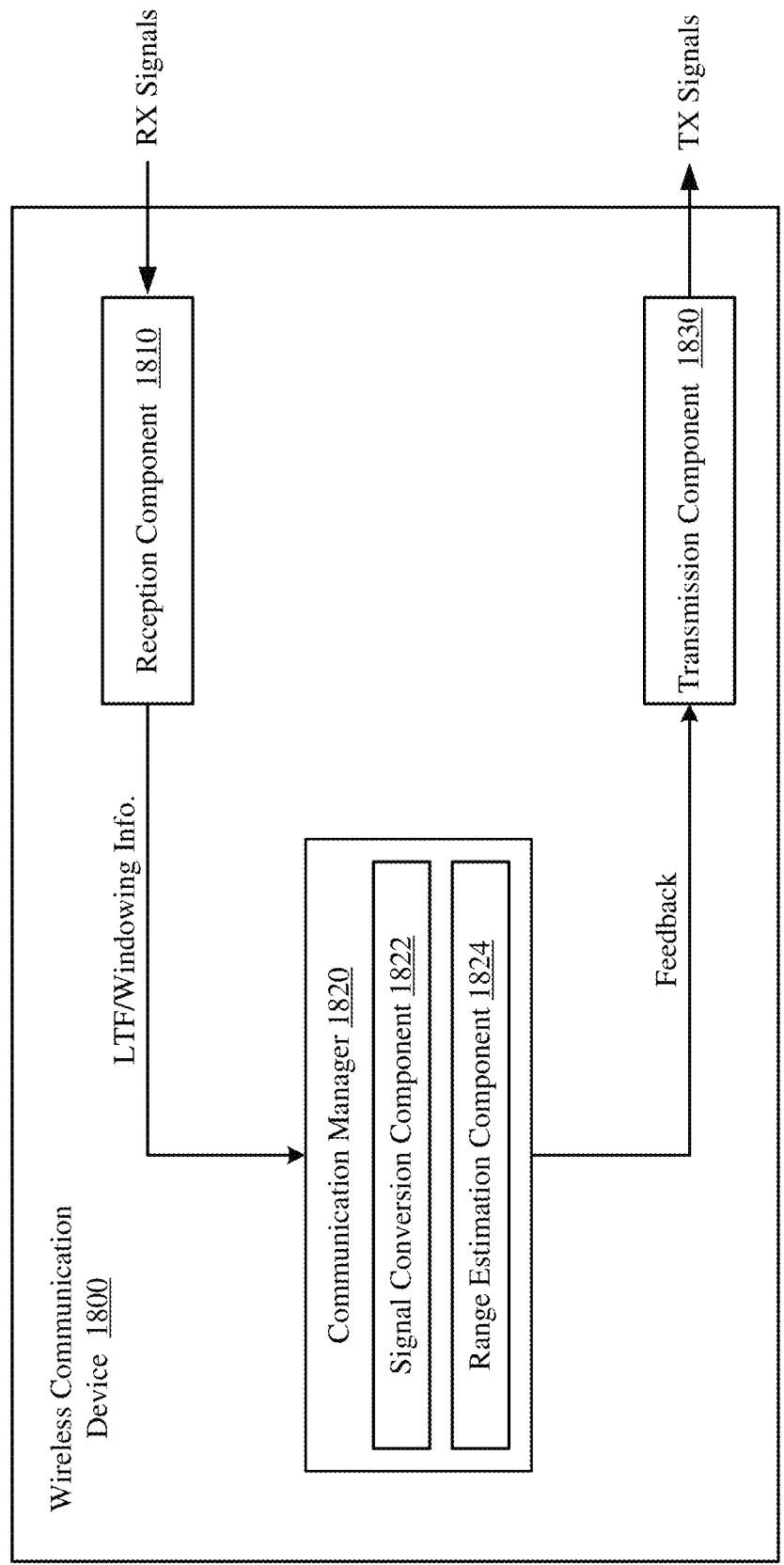
FIG. 18 shows a block diagram of an example wireless communication device according to some implementations.

FIG. 18 shows a block diagram of an example wireless communication device 1800 according to some implementations. In some implementations, the wireless communication device 1800 is configured to perform the process 1600 described above with reference to FIG. 16. The wireless communication device 1800 can be an example implementation of the wireless communication device 500 described above with reference to FIG. 5. For example, the wireless communication device 1800 can be a chip, SoC, chipset, package or device that includes at least one processor and at least one modem (for example, a Wi-Fi (IEEE 802.11) modem or a cellular modem).

The wireless communication device 1800 includes a reception component 1810, a communication manager 1820, and a transmission component 1830. The communication manager 1820 further includes a signal conversion component 1822 and a range estimation component 1824. Portions of one or more of the components 1822 and 1824 may be implemented at least in part in hardware or firmware. In some implementations, at least some of the components 1822 or 1824 are implemented at least in part as software stored in a memory (such as the memory 508). For example, portions of one or more of the components 1822 and 1824 can be implemented as non-transitory instructions (or "code") executable by a processor (such as the processor 506) to perform the functions or operations of the respective component.

The reception component 1810 is configured to receive RX signals from a transmitting device. In some implementations, the RX signals may include a wireless signal representing an LTF of a PPDU. In some implementations, the RX signals also may include windowing information indicating whether a window function is applied to a sequence of modulation symbols. The communication manager 1820 is configured to control or manage communications with the transmitting device. In some implementations, the signal conversion component 1822 may convert the wireless signal to the sequence of modulation symbols based on a Fourier transform, where each of the modulation symbols is modulated on a respective subcarrier associated with the LTF; and the range estimation component 1824 may estimate a range of the transmitting device to the wireless communication device based on the received LTF signal and the windowing information. The transmission component 1830 is configured to transmit TX signals to the transmitting device. In some implementations, the TX signals may include feedback based on the estimated range of the transmitting device.

Implementation examples are described in the following numbered clauses:

1. A method for wireless communication by a wireless communication device, the method including:
   receiving, from a receiving device, a first frame carrying first windowing information indicating whether the receiving device supports windowing of a long training field (LTF) of a physical layer convergence protocol (PLCP) protocol data unit (PPDU);
   obtaining a sequence of modulation symbols to be included in the LTF of the PPDU, each of the modulation symbols being modulated on a respective subcarrier associated with the LTF;
   selectively applying a window function to the sequence of modulation symbols based on the first windowing information in the first frame;
   converting the sequence of modulation symbols to a time-domain LTF signal based on an inverse Fourier transform; and
   transmitting the LTF signal to the receiving device.
2. The method of clause 1, wherein the first frame is an initial fine timing measurement request (IFTMR) frame that initiates a fine timing measurement (FTM) procedure.
3. The method of any of clauses 1 or 2, further including:
   transmitting an initial fine timing measurement (IFTM) frame to the receiving device responsive to receiving the IFTMR frame, the IFTM frame carrying second windowing information indicating whether the wireless communication device supports the windowing of the LTF.
4. The method of any of clauses 1-3, wherein the first windowing information is carried in a ranging parameters field of the IFTMR frame and the second windowing information is carried in a ranging parameters field of the IFTM frame.
5. The method of clause 1, further including:
   transmitting, to the receiving device, an IFTMR frame that initiates an FTM procedure, the first frame being an IFTM frame that responds to the IFTMR frame.
6. The method of any of clauses 1 or 5, wherein the IFTMR frame carries second windowing information indicating whether the wireless communication device supports the windowing of the LTF.
7. The method of any of clauses 1,5, or 6, wherein the first windowing information is carried in a ranging parameters field of the IFTM frame and the second windowing information is carried in a ranging parameters field of the IFTMR frame.
8. The method of any of clauses 1-7, wherein the selective applying of the window function includes:
   determining a range of the receiving device to the wireless communication device; and
   determining whether to apply the window function to the sequence of modulation symbols based on the determined range.
9. The method of any of clauses 1-8, wherein the determining of the range of the receiving device includes:
   receiving, from the receiving device, ranging information indicating an estimate of the range.

10. The method of any of clauses 1-9, wherein the selective applying of the window function includes:
estimating a wireless channel over which the LTF signal is transmitted; and
determining whether to apply the window function to the sequence of modulation symbols based on the channel estimate.

11. The method of any of clauses 1-10, wherein the selective applying of the window function includes:
determining a security requirement for the LTF signal; and
determining whether to apply the window function to the sequence of modulation symbols based on the security requirement.

12. The method of any of clauses 1-11, wherein the window function is applied to the sequence of modulation symbols based on the first windowing information indicating that the receiving device supports windowing of the LTF.

13. The method of any of clauses 1-12, further including:
transmitting, to the receiving device, second windowing information indicating that the window function is applied to the sequence of modulation symbols.

14. The method of any of clauses 1-13, wherein the second windowing information is transmitted via a signal field of the PPDU that includes the LTF signal.

15. The method of any of clauses 1-14, wherein the transmitted LTF signal does not include a cyclic prefix.

16. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 1-15.

17. A method for wireless communication by a wireless communication device, including:
receiving, from a transmitting device, a wireless signal representing a long training field (LTF) of a physical layer convergence protocol (PLCP) protocol data unit (PPDU);
converting the wireless signal to a sequence of modulation symbols based on a Fourier transform, each of the modulation symbols being modulated on a respective subcarrier associated with the LTF;
receiving, from the transmitting device, first windowing information indicating whether a window function is applied to the sequence of modulation symbols; and
estimating a range of the transmitting device to the wireless communication device based on the received LTF signal and the first windowing information.

18. The method of clause 17, wherein the first windowing information is received via a signal field of the PPDU that includes the LTF signal.

19. The method of any of clauses 17 or 18, further including:
determining the first windowing information based on a value of a modulation and coding scheme (MCS) field of the signal field.

20. The method of any of clauses 17 or 18, further including:
determining the first windowing information based on values of a coding field and a low-density parity-check (LDPC) extra symbol segment field of the signal field.

21. The method of any of clauses 17 or 18, further including:
determining the first windowing information based on a value of a beamformed field of the signal field.

22. The method of any of clauses 17 or 18, further including:
determining the first windowing information based on a value of a cyclic redundancy check (CRC) field of the signal field.

23. The method of any of clauses 17-22, wherein the first windowing information is received via an initial fine timing measurement request (IFTMR) frame that initiates a fine timing measurement (FTM) procedure.

24. The method of any of clauses 17-23, further including:
transmitting an initial fine timing measurement (IFTM) frame to the transmitting device responsive to receiving the IFTMR frame, the IFTM frame carrying second windowing information indicating whether the wireless communication device supports the application of the window function by the transmitting device.

25. The method of any of clauses 17-24, wherein the first windowing information is carried in a ranging parameters field of the IFTMR frame and the second windowing information is carried in a ranging parameters field of the IFTM frame.

26. The method of any of clauses 17-22, further including:
transmitting, to the transmitting device, an IFTMR frame that initiates an FTM procedure, the first windowing information being received via an IFTM frame that responds to the IFTMR frame.

27. The method of any of clauses 17-22 or 26, wherein the IFTMR frame carries second windowing information indicating whether the wireless communication device supports the application of the window function by the transmitting device.

28. The method of any of clauses 17-22,26, or 27, wherein the first windowing information is carried in a ranging parameters field of the IFTM frame and the second windowing information is carried in a ranging parameters field of the IFTMR frame.

29. The method of any of clauses 17-28, wherein the received wireless signal does not include a cyclic prefix.

30. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 17-29.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:
    receiving, from a receiving device, a first frame carrying first windowing information indicating whether the receiving device supports windowing of a long training field (LTF) of a physical layer convergence protocol (PLCP) protocol data unit (PPDU);
    obtaining a sequence of modulation symbols to be included in the LTF of the PPDU, each of the modulation symbols being modulated on a respective subcarrier associated with the LTF;
    selectively applying a window function to the sequence of modulation symbols based on the first windowing information in the first frame;
    converting the sequence of modulation symbols to a time-domain LTF signal based on an inverse Fourier transform; and
    transmitting the LTF signal to the receiving device.

2. The method of claim 1, wherein the first frame is an initial fine timing measurement request (IFTMR) frame that initiates a fine timing measurement (FTM) procedure.

3. The method of claim 2, further comprising:
    transmitting an initial fine timing measurement (IFTM) frame to the receiving device responsive to receiving the IFTMR frame, the IFTM frame carrying second windowing information indicating whether the wireless communication device supports the windowing of the LTF.

4. The method of claim 3, wherein the first windowing information is carried in a ranging parameters field of the IFTMR frame and the second windowing information is carried in a ranging parameters field of the IFTM frame.

5. The method of claim 1, further comprising:
    transmitting, to the receiving device, an IFTMR frame that initiates an FTM procedure, the first frame being an IFTM frame that responds to the IFTMR frame.

6. The method of claim 5, wherein the IFTMR frame carries second windowing information indicating whether the wireless communication device supports the windowing of the LTF.

7. The method of claim 6, wherein the first windowing information is carried in a ranging parameters field of the IFTM frame and the second windowing information is carried in a ranging parameters field of the IFTMR frame.

8. The method of claim 1, wherein the selective applying of the window function comprises:
    determining a range of the receiving device to the wireless communication device; and
    determining whether to apply the window function to the sequence of modulation symbols based on the determined range.

9. The method of claim 8, wherein the determining of the range of the receiving device comprises:
    receiving, from the receiving device, ranging information indicating an estimate of the range.

10. The method of claim 1, wherein the selective applying of the window function comprises:
    estimating a wireless channel over which the LTF signal is transmitted; and
    determining whether to apply the window function to the sequence of modulation symbols based on the channel estimate.

11. The method of claim 1, wherein the selective applying of the window function comprises:
    determining a security requirement for the LTF signal; and
    determining whether to apply the window function to the sequence of modulation symbols based on the security requirement.

12. The method of claim 1, wherein the window function is applied to the sequence of modulation symbols based on the first windowing information indicating that the receiving device supports windowing of the LTF.

13. The method of claim 12, further comprising:
    transmitting, to the receiving device, second windowing information indicating that the window function is applied to the sequence of modulation symbols.

14. The method of claim 13, wherein the second windowing information is transmitted via a signal field of the PPDU that includes the LTF signal.

15. The method of claim 1, wherein the transmitted LTF signal does not include a cyclic prefix.

16. A wireless communication device comprising:
    at least one modem;

at least one processor communicatively coupled with the at least one modem; and at least one memory communicatively coupled with the at least one processor and storing processor-readable code that, when executed by the at least one processor in conjunction with the at least one modem, is configured to:

receive, from a receiving device, a first frame carrying first windowing information indicating whether the receiving device supports windowing of a long training field (LTF) of a physical layer convergence protocol (PLCP) protocol data unit (PPDU);

obtain a sequence of modulation symbols to be included in the LTF of the PPDU, each of the modulation symbols being modulated on a respective subcarrier associated with the LTF;

selectively apply a window function to the sequence of modulation symbols based on the first windowing information in the first frame; and transmit the LTF signal to the receiving device.

17. The wireless communication device of claim 16, wherein the first frame is an initial fine timing measurement request (IFTMR) frame that initiates a fine timing measurement (FTM) procedure, execution of the processor-readable code being further configured to:

transmit an initial fine timing measurement (IFTM) frame to the receiving device responsive to receiving the IFTMR frame, the IFTM frame carrying second windowing information indicating whether the wireless communication device supports the windowing of the LTF.

18. The wireless communication device of claim 16, wherein execution of the processor-readable code is further configured to:

transmit, to the receiving device, an IFTMR frame that initiates an FTM procedure, the IFTMR frame carrying second windowing information indicating whether the wireless communication device supports the windowing of the LTF, the first frame being an IFTM frame that responds to the IFTMR frame.

19. The wireless communication device of claim 16, wherein the window function is applied to the sequence of modulation symbols based on the first windowing information indicating that the receiving device supports windowing of the LTF, execution of the processor-readable code being further configured to:

transmit, to the receiving device, second windowing information indicating that the window function is applied to the sequence of modulation symbols.

20. The wireless communication device of claim 19, wherein the second windowing information is transmitted via a signal field of the PPDU that includes the LTF signal.

21. A method for wireless communication by a wireless communication device, comprising:

receiving, from a transmitting device, a wireless signal representing a long training field (LTF) of a physical layer convergence protocol (PLCP) protocol data unit (PPDU);

converting the wireless signal to a sequence of modulation symbols based on a Fourier transform, each of the modulation symbols being modulated on a respective subcarrier associated with the LTF;

receiving, from the transmitting device, first windowing information indicating whether a window function is applied to the sequence of modulation symbols; and estimating a range of the transmitting device to the wireless communication device based on the received LTF signal and the first windowing information.

22. The method of claim 21, wherein the first windowing information is received via a signal field of the PPDU that includes the LTF signal.

23. The method of claim 22, further comprising:
determining the first windowing information based on a value of a modulation and coding scheme (MCS) field of the signal field.

24. The method of claim 22, further comprising:
determining the first windowing information based on values of a coding field and a low-density parity-check (LDPC) extra symbol segment field of the signal field.

25. The method of claim 22, further comprising:
determining the first windowing information based on a value of a beamformed field of the signal field.

26. The method of claim 22, further comprising:
determining the first windowing information based on a value of a cyclic redundancy check (CRC) field of the signal field.

27. The method of claim 21, wherein the first windowing information is received via an initial fine timing measurement request (IFTMR) frame that initiates a fine timing measurement (FTM) procedure.

28. The method of claim 27, further comprising:
transmitting an initial fine timing measurement (IFTM) frame to the transmitting device responsive to receiving the IFTMR frame, the IFTM frame carrying second windowing information indicating whether the wireless communication device supports the application of the window function by the transmitting device.

29. The method of claim 28, wherein the first windowing information is carried in a ranging parameters field of the IFTMR frame and the second windowing information is carried in a ranging parameters field of the IFTM frame.

30. The method of claim 21, further comprising:
transmitting, to the transmitting device, an IFTMR frame that initiates an FTM procedure, the first windowing information being received via an IFTM frame that responds to the IFTMR frame.

31. The method of claim 30, wherein the IFTMR frame carries second windowing information indicating whether the wireless communication device supports the application of the window function by the transmitting device.

32. The method of claim 31, wherein the first windowing information is carried in a ranging parameters field of the IFTM frame and the second windowing information is carried in a ranging parameters field of the IFTMR frame.

33. The method of claim 21, wherein the received wireless signal does not include a cyclic prefix.

34. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:

receive, from a transmitting device, a wireless signal representing a long training field (LTF) of a physical layer convergence protocol (PLCP) protocol data unit (PPDU);

convert the wireless signal to a sequence of modulation symbols based on a Fourier transform, each of the modulation symbols being modulated on a respective subcarrier associated with the LTF;

receive, from the transmitting device, first windowing information indicating whether a window function is applied to the sequence of modulation symbols; and estimate a range of the transmitting device to the wireless communication device based on the received LTF signal and the first windowing information.

35. The wireless communication device of claim 34, wherein the first windowing information is received via a signal field of the PPDU that includes the LTF signal.

36. The wireless communication device of claim 34, wherein the first windowing information is received via an initial fine timing measurement request (IFTMR) frame that initiates a fine timing measurement (FTM) procedure, execution of the processor-readable code being further configured to:

transmit an initial fine timing measurement (IFTM) frame to the transmitting device responsive to receiving the IFTMR frame, the IFTM frame carrying second windowing information indicating whether the wireless communication device supports the application of the window function by the transmitting device.

37. The wireless communication device of claim 34, wherein execution of the processor-readable code is further configured to:

transmit, to the transmitting device, an IFTMR frame that initiates an FTM procedure, the IFTMR frame carrying second windowing information indicating whether the wireless communication device supports the application of the window function by the transmitting device, the first windowing information being received via an IFTM frame that responds to the IFTMR frame.

* * * * *